(12) United States Patent
Kurata

(10) Patent No.: US 7,671,790 B2
(45) Date of Patent: Mar. 2, 2010

(54) POSITIONING SYSTEM, POSITIONING DEVICE, COMMUNICATION BASE STATION, CONTROL METHOD, AND RECORDING MEDIUM STORING PROGRAM

(75) Inventor: Tomoyuki Kurata, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 87 days.

(21) Appl. No.: 11/826,676

(22) Filed: Jul. 17, 2007

(65) Prior Publication Data

US 2008/0018528 A1  Jan. 24, 2008

(30) Foreign Application Priority Data

Jul. 20, 2006 (JP) ............... 2006-198758
Jul. 21, 2006 (JP) ............... 2006-198921

(51) Int. Cl.
G01S 5/14 (2006.01)
(52) U.S. Cl. ............... 342/357.02; 342/357.03; 342/357.12
(58) Field of Classification Search ............ 342/357.02, 342/357.03, 357.09, 357.1, 357.12
See application file for complete search history.

(56) References Cited

U.S. PATENT DOCUMENTS

| 6,525,689 | B2 | 2/2003 | Dooley et al. | |
|---|---|---|---|---|
| 7,468,691 | B2 * | 12/2008 | Yoshioka | 342/357.12 |
| 2003/0132879 | A1 | 7/2003 | Dooley et al. | |
| 2006/0079248 | A1 | 4/2006 | Otsuka et al. | |

FOREIGN PATENT DOCUMENTS

| DE | 197 31 110 A1 | 1/1999 |
|---|---|---|
| EP | 1 115 009 A2 | 7/2001 |
| JP | H10-339772 A | 12/1998 |
| JP | 2001-083231 A | 3/2001 |
| JP | 2003-057327 A | 2/2003 |
| JP | 2003-535345 A | 11/2003 |
| JP | 2006-109355 A | 4/2006 |
| WO | WO-99/18677 A1 | 4/1999 |
| WO | WO-02/31526 A2 | 4/2002 |
| WO | WO-03/038466 A2 | 5/2003 |

* cited by examiner

Primary Examiner—Thomas H Tarcza
Assistant Examiner—Fred H Mull
(74) Attorney, Agent, or Firm—Global IP Counselors, LLP

(57) ABSTRACT

A communication base station includes a propagation time evaluation section which determines whether or not a propagation time required for a communication radio wave to propagate between the communication base station and a positioning device is within a predetermined allowable time range, a code phase calculation section which calculates a code phase of each satellite signal, a difference calculation section which calculates a difference between the code phase calculated by the communication base station and a positioning-side code phase, a difference evaluation section which determines whether or not the difference is within a multipath range which is a difference range when the positioning-side code phase is affected by a multipath, a correction value transmission section which transmits the code phase calculated by the communication base station to the positioning device when the difference evaluation section has determined that the difference is within the multipath range, and the like.

12 Claims, 21 Drawing Sheets

CODE PHASE CALCULATED BY TERMINAL : CPm1, CPm2, CPm3, CPm4

↓

RECEIVES BASE STATION CODE PHASE CPb FOR ONLY GPS SATELLITE 12c

↓

CODE PHASES USED FOR POSITIONING : CPm1, CPm2, CPb3, CPm4

FIG. 8
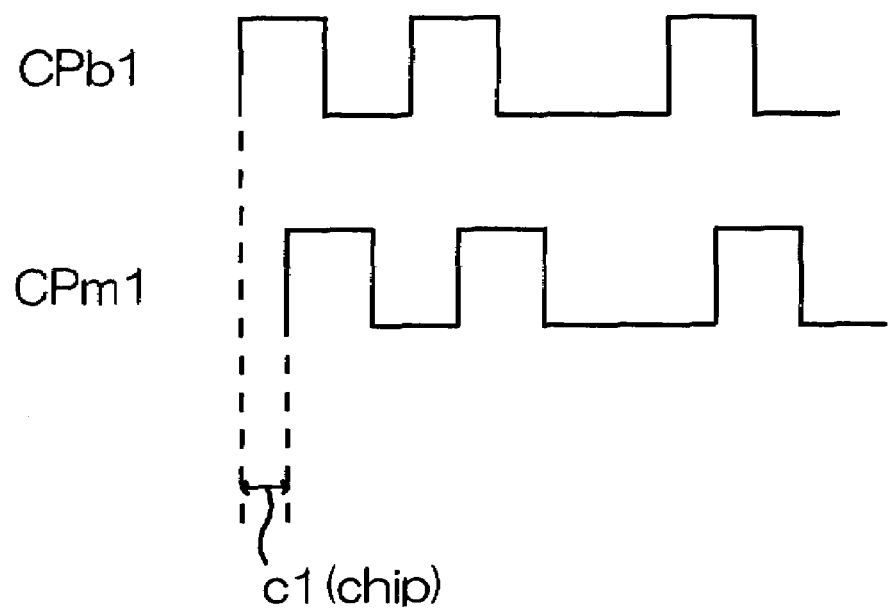
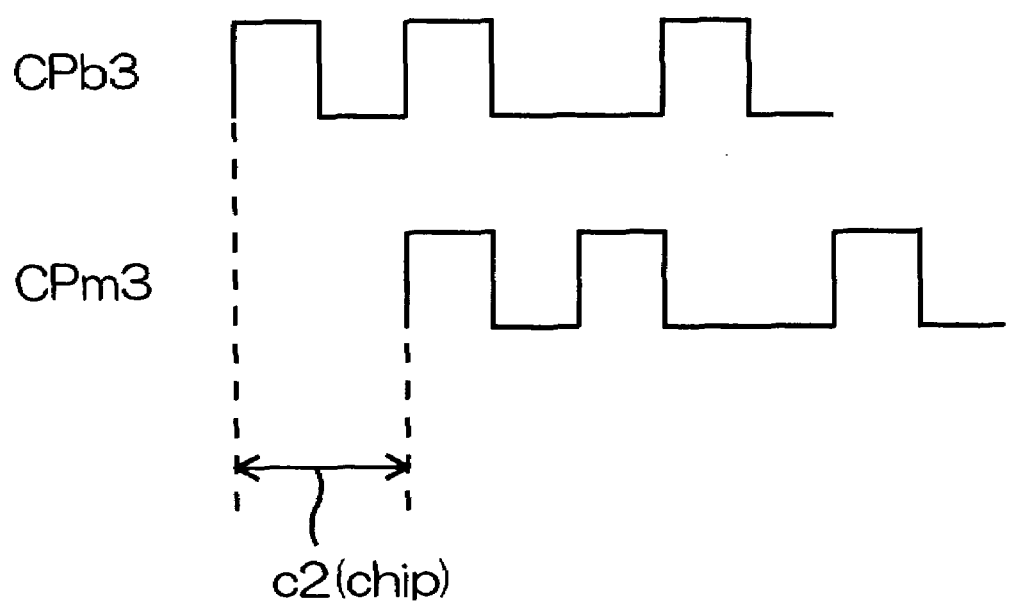

EXPRESSION 1: DISTANCE $d = RTT/2 \times c$    $c$ : SPEED OF LIGHT

CALCULATES INITIAL POSITION Pip FROM BASE STATION POSITION Pb, TRANSMISSION DIRECTION $\theta$, AND DISTANCE d

FIG. 14

EXPRESSION 2: $\text{Timedif} = \dfrac{\{|\sqrt{(X_s-X_b)^2+(Y_s-Y_b)^2+(Z_s-Z_b)^2} - \sqrt{(X_s-X_{ip})^2+(Y_s-Y_{ip})^2+(Z_s-Z_{ip})^2}\,|\}}{c}$ Timedif : ESTIMATED DIFFERENCE IN DELAY TIME (MS)

c : SPEED OF LIGHT

EXPRESSION 3: CPdif = Timedif × 1023

*1 MS = 1023 CHIPS

FIG. 15
$ELVb > ELVip$
EXPRESSION 4A : $CPip = CPb + CPdif$
  $CPip$ : ESTIMATED CODE PHASE
  $CPb$ : BASE STATION CODE PHASE
  $CPdif$ : ESTIMATED DIFFERENCE
  $ELVb$ : ANGLE OF ELEVATION FROM BASE STATION
    POSITION $Pb$ TO SATELLITE POSITION $Ps$
  $ELVip$ : ANGLE OF ELEVATION FROM INITIAL POSITION
    $Pip$ TO SATELLITE POSITION $Ps$
$ELVb < ELVip$
EXPRESSION 4B : $CPip = CPb - CPdif$

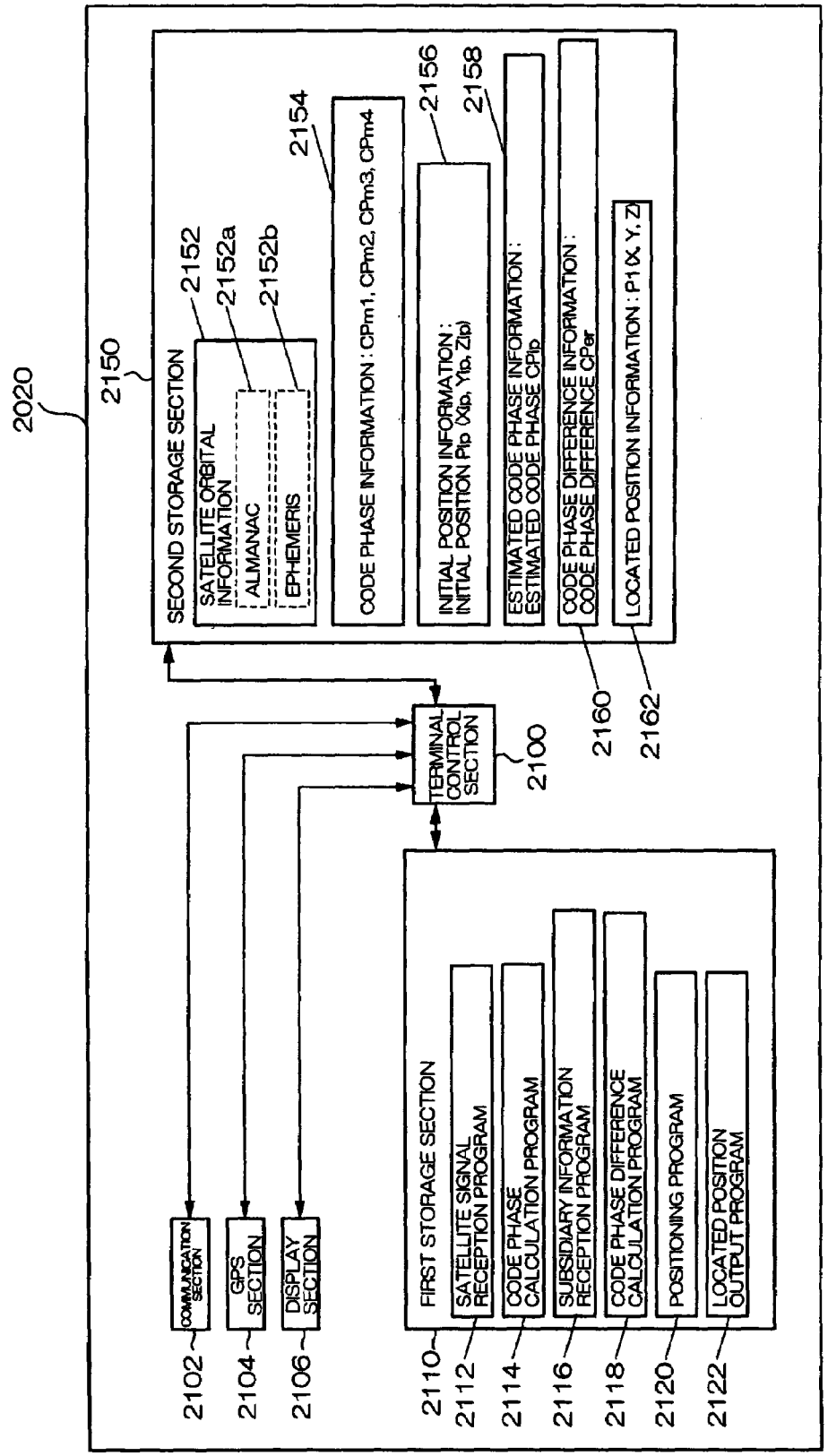

FIG. 17A
EXPRESSION 5 : $CPer = |CPip - CPm|$
$CPm$ : TERMINAL CODE PHASE
FIG. 17B
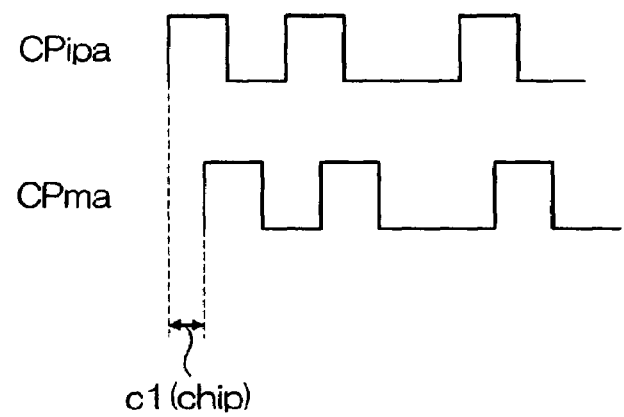
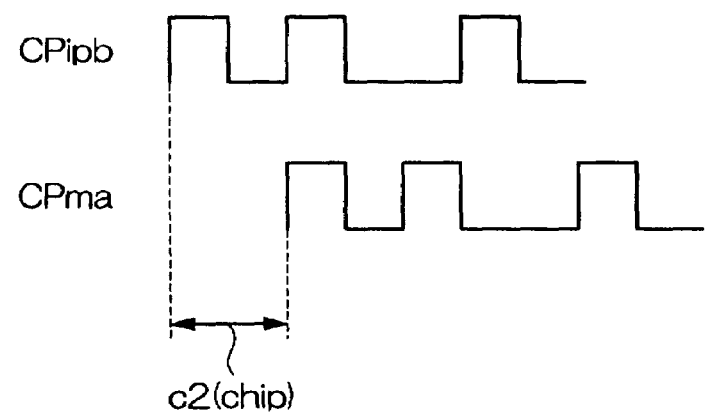

FIG. 18A

SATELLITE OF WHICH CPer IS LESS THAN THRESHOLD VALUE $\alpha$ :
USES TERMINAL CODE PHASE CPm SATELLITE OF WHICH CPer IS EQUAL TO OR GREATER THAN
THRESHOLD VALUE $\alpha$ : USES ESTIMATED CODE PHASE CPip

FIG. 18B

GPS SATELLITE 12a : CPma

GPS SATELLITE 12b : CPmb

GPS SATELLITE 12c : CPipc

GPS SATELLITE 12d : CPmd

000# POSITIONING SYSTEM, POSITIONING DEVICE, COMMUNICATION BASE STATION, CONTROL METHOD, AND RECORDING MEDIUM STORING PROGRAM

Japanese Patent Application No. 2006-198758 filed on Jul. 20, 2006 and Japanese Patent Application No. 2006-198921 filed on Jul. 21, 2006, are hereby incorporated by reference in their entirety.

BACKGROUND OF THE INVENTION

The present invention relates to a positioning system which locates the present position using satellite signals from positioning satellites.

A positioning system has been used in practice which locates the present position of a positioning device utilizing a satellite positioning system (SPS) which is a navigation system utilizing satellites (see JP-A-10-339772 and the like).

The positioning device may receive a radio wave from the satellite in a state in which an indirect wave (hereinafter called "multipath wave"), which occurs when the radio wave is reflected by a building or the like, interferes with a direct wave. The multipath wave reaches the positioning device after a delay due to reflection by a building or the like. When the multipath wave interferes with the direct wave, the correlation peak value varies, whereby a large error occurs in positioning calculations. In this specification, an environment in which a multipath easily occurs is called a multipath environment.

In order to solve the above problem, technology has been proposed for a positioning device integrated in a portable telephone in which the positioning device utilizes the position of a communication base station when the positioning device has determined that the position of the communication base station is more accurate than the position calculated using satellite radio waves (e.g. JP-A-2006-109355).

The code phase of a coarse and acquisition (C/A) code calculated by the communication base station may be used as the code phase at the positioning device.

However, since the position of the communication base station is fixed, the position output according to the technology disclosed in JP-A-2006-109355 may be inconvenient when the positioning device integrated in a portable telephone moves.

Moreover, since the code phase of the C/A code calculated by the communication base station should differ from the true code phase at the position of the positioning device, the accuracy of the located position may deteriorate when uniformly using the code phase at the communication base station as the code phase at the positioning device merely based on the situation in which the positioning device can communicate with the communication base station.

SUMMARY

According to one aspect of the invention, there is provided a communication base station which can communicate with a positioning device which locates a position using satellite signals from a plurality of positioning satellites and is located at a fixed position, the communication base station comprising:

a propagation time calculation section which calculates a propagation time required for a communication radio wave to propagate between the communication base station and the positioning device;

a propagation time evaluation section which determines whether or not the propagation time is within a predetermined allowable time range;

a satellite signal reception section which receives the satellite signals;

a code phase calculation section which calculates a code phase of each of the satellite signals;

a positioning-side code phase reception section which receives a positioning-side code phase which is a code phase of each of the satellite signals calculated by the positioning device;

a difference calculation section which calculates a difference between the code phase calculated by the code phase calculation section and the positioning-side code phase received from the positioning device;

a difference evaluation section which determines whether or not the difference is within a multipath range which is a difference range when the positioning-side code phase is affected by a multipath; and a correction value transmission section which transmits the code phase calculated by the communication base station to the positioning device when the difference evaluation section has determined that the difference is within the multipath range.

According to another aspect of the invention, there is provided a positioning device which can communicate with a communication base station located at a fixed position and locates a position using satellite signals from a plurality of positioning satellites, when the communication base station has determined that a propagation time required for a communication radio wave to propagate between the communication base station and the positioning device is within a predetermined allowable time range, and has calculated a difference between a code phase calculated by the communication base station based on the received satellite signal and a positioning-side code phase which is a code phase of each of the satellite signals calculated by the positioning device, and the difference is within a multipath range which is a difference range when the positioning-side code phase is affected by a multipath, the positioning device receiving the code phase calculated by the communication base station and locating a position using the code phase calculated by the communication base station and the positioning-side code phase.

According to a further aspect of the invention, there is provided a positioning system comprising a positioning device which locates a position using satellite signals from a plurality of positioning satellites and a communication base station which can communicate with the positioning device, the communication base station including:

an initial position calculation section which calculates an initial position of the positioning device;

a code phase calculation section which calculates a code phase of the satellite signal at a position of the communication base station;

an estimated difference calculation section which estimates a difference between the code phase calculated by the code phase calculation section and a code phase of the satellite signal on assumption that the communication base station is located at the initial position as an estimated difference;

an estimated code phase calculation section which estimates the code phase on assumption that the communication base station is located at the initial position as an estimated code phase based on the code phase calculated by the code phase calculation section and the estimated difference; and a subsidiary information transmission section which transmits the initial position and the estimated code phase to the positioning device; and the positioning device including:

a terminal code phase calculation section which calculates a code phase at a position of the positioning device as a terminal code phase based on the satellite signal;

a code phase difference calculation section which calculates a code phase difference between the estimated code phase and the terminal code phase; and a positioning section which locates a position using the estimated code phase or the terminal code phase depending on the code phase difference.

According to still another aspect of the invention, there is provided a positioning device which locates a position using satellite signals from a plurality of positioning satellites, the positioning device comprising:

a base station position information acquisition section which acquires base station position information from a communication base station which can communicate with the positioning device, the base station position information indicating a position of the communication base station;

a transmission direction information acquisition section which acquires transmission direction information indicating a transmission direction of a communication radio wave transmitted from the communication base station to the positioning device;

a base station code phase acquisition section which acquires a base station code phase from the communication base station, the base station code phase being a code phase at a position of the communication base station calculated by the communication base station based on the satellite signal;

a propagation time calculation section which calculates a propagation time required for a communication radio wave to propagate between the communication base station and the positioning device;

an initial position calculation section which calculates an initial position of the positioning device based on the position of the communication base station, the transmission direction, and the propagation time;

an estimated difference calculation section which estimates a difference between the code phase at the position of the communication base station and a code phase of the satellite signal at the initial position as an estimated difference;

an estimated code phase calculation section which estimates the code phase at the initial position as an estimated code phase based on the base station code phase and the estimated difference;

a terminal code phase calculation section which calculates a code phase at a position of the positioning device as a terminal code phase based on the satellite signal;

a code phase difference calculation section which calculates a code phase difference between the estimated code phase and the terminal code phase; and a positioning section which locates a position using the estimated code phase or the terminal code phase depending on the code phase difference.

According to a still further aspect of the invention, there is provided a positioning device which locates a position using satellite signals from a plurality of positioning satellites, the positioning device comprising:

a base station position information acquisition section which acquires base station position information from a communication base station which can communicate with the positioning device, the base station position information indicating a position of the communication base station;

a base station code phase acquisition section which acquires a base station code phase from the communication base station, the base station code phase being a code phase at a position of the communication base station calculated by the communication base station based on the satellite signal;

an initial position calculation section which calculates an initial position utilizing communication radio waves from a plurality of the communication base stations;

an estimated difference calculation section which estimates a difference between the code phase at the position of the communication base station and a code phase of the satellite signal at the initial position as an estimated difference;

an estimated code phase calculation section which estimates the code phase at the initial position as an estimated code phase based on the base station code phase and the estimated difference;

a terminal code phase calculation section which calculates a code phase at a position of the positioning device as a terminal code phase based on the satellite signal;

a code phase difference calculation section which calculates a code phase difference between the estimated code phase and the terminal code phase; and a positioning section which locates a position using the estimated code phase or the terminal code phase depending on the code phase difference.

BRIEF DESCRIPTION OF THE SEVERAL VIEWS OF THE DRAWING

FIG. 8 is a view illustrative of a process based on a code phase difference calculation program.

FIG. 14 is a view illustrative of a process based on an estimated difference calculation program.

FIG. 15 is a view illustrative of a process based on an estimated code phase calculation program.

FIG. 16 is a schematic view showing the main software configuration of the terminal.

FIGS. 17A and 17B are views illustrative of a process based on a code phase difference calculation program.

FIGS. 18A and 18B are views illustrative of a process based on a positioning program.

DETAILED DESCRIPTION OF THE EMBODIMENT

Figure 1:
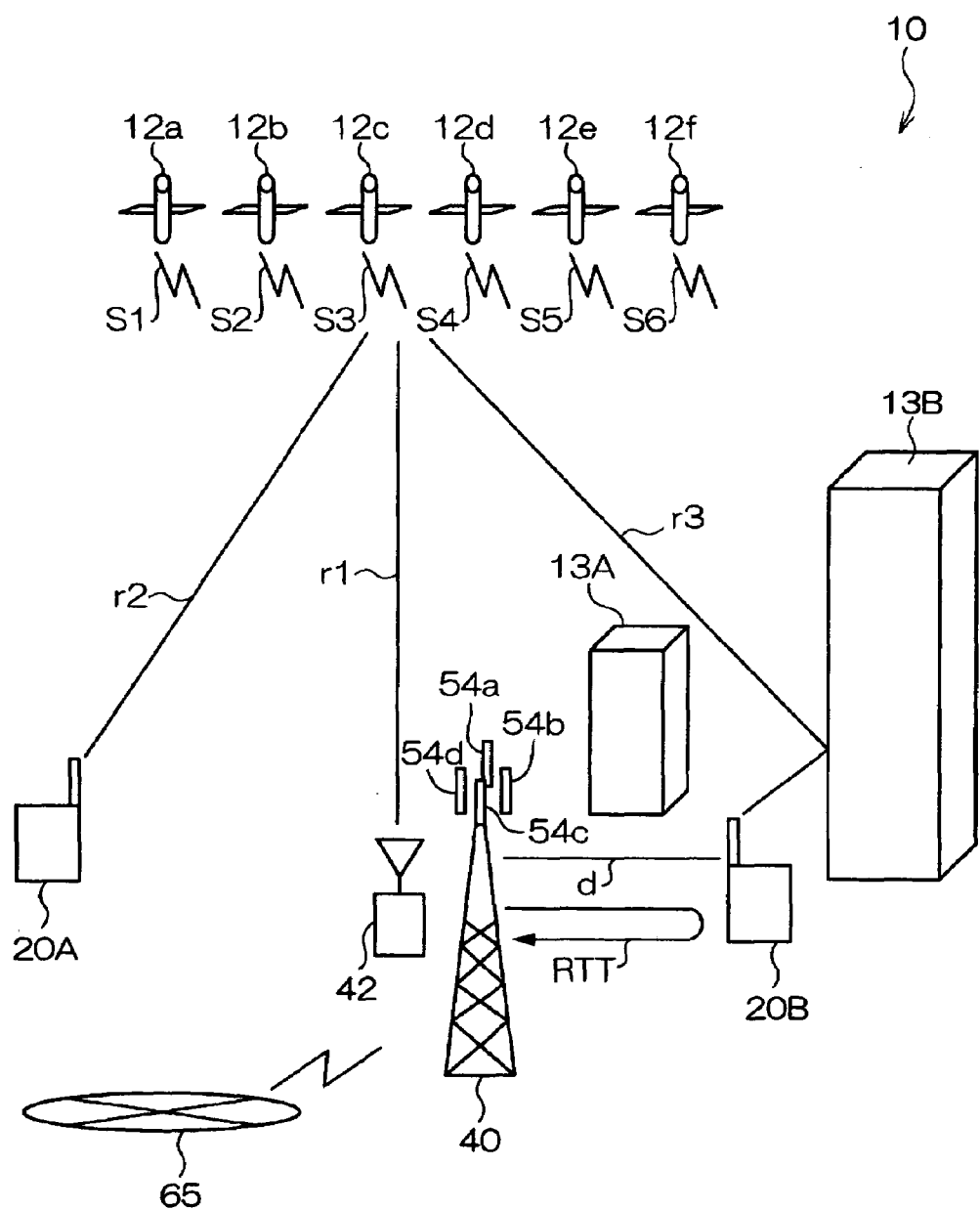
FIG. 1 is a schematic view showing a positioning system according to one embodiment of the invention.

The invention may realize a communication base station which provides a code phase at the communication base station to a positioning device which can communicate with the communication base station only when a condition is satisfied whereby it is appropriate for the positioning device to use the code phase at the communication base station.

The invention may also allow occurrence of a multipath to be determined and the position to be accurately located when a multipath occurs in comparison with the case of using the code phase at the communication base station.

According to one embodiment of the invention, there is provided a communication base station which can communicate with a positioning device which locates a position using satellite signals from a plurality of positioning satellites and is located at a fixed position, the communication base station comprising:

a propagation time calculation section which calculates a propagation time required for a communication radio wave to propagate between the communication base station and the positioning device;

a propagation time evaluation section which determines whether or not the propagation time is within a predetermined allowable time range;

a satellite signal reception section which receives the satellite signals;

a code phase calculation section which calculates a code phase of each of the satellite signals;

a positioning-side code phase reception section which receives a positioning-side code phase which is a code phase of each of the satellite signals calculated by the positioning device;

a difference calculation section which calculates a difference between the code phase calculated by the code phase calculation section and the positioning-side code phase received from the positioning device;

a difference evaluation section which determines whether or not the difference is within a multipath range which is a difference range when the positioning-side code phase is affected by a multipath; and a correction value transmission section which transmits the code phase calculated by the communication base station to the positioning device when the difference evaluation section has determined that the difference is within the multipath range.

According to this configuration, the communication base station can determine whether or not the propagation time is within the allowable time range using the propagation time evaluation section. Therefore, the communication base station can identify whether or not the positioning device is positioned close to the communication base station in addition to whether or not the positioning device is positioned in the communication area (cell) of the communication base station.

The communication base station can calculate the difference between the code phase calculated by the communication base station and the positioning-side code phase using the difference calculation section. Since the true positions of the communication base station and the positioning device usually differ even if the communication base station is close to the positioning device, the difference may include the difference due to the difference in true position, the difference due to an error caused by a factor other than a multipath, and the difference due to an error caused by a multipath.

The communication base station can determine whether or not the difference is within the multipath range using the difference evaluation section. Specifically, the communication base station can determine not only whether or not a difference exists between the code phase calculated by the communication base station and the positioning-side code phase, but also whether or not the difference is within the multipath range.

Since the communication base station includes the correction value transmission section, the communication base station can transmit the code phase calculated by the communication base station to the positioning device when the difference evaluation section has determined that the difference is within the multipath range.

Since the communication base station can identify whether or not the positioning device is positioned close to the communication base station, the communication base station can transmit the code phase calculated by the communication base station to the positioning device when the communication base station has determined that the condition is satisfied whereby the positioning device is positioned close the communication base station and the difference is within the multipath range. When the condition is satisfied whereby the positioning device is positioned extremely close the communication base station, the positioning-side code phase should be almost the same as the code phase calculated by the communication base station if the positioning-side code phase is not affected by a multipath. Therefore, it is appropriate for the positioning device to locate the position using the code phase calculated by the communication base station. It is also appropriate for the positioning device to locate the position using the code phase calculated by the nearby communication base station instead of the positioning-side code phase calculated by the positioning device using a multipath signal. Specifically, the positioning accuracy of the positioning device is likely to be improved.

This allows the code phase at the base station to be provided to the positioning device which can communicate with the communication base station only when the condition is satisfied whereby it is appropriate for the positioning device to use the code phase at the base station.

In the communication base station, the allowable time range may be specified as a time range when the communication base station and the positioning device are so close that positions of the communication base station and the positioning device are considered to be almost identical.

In the communication base station, the multipath range may be specified taking into account a distance corresponding to the allowable time range and a calculation error of the positioning-side code phase.

According to this configuration, the communication base station can reliably determine whether or not the positioning-side code phase is affected by a multipath.

According to one embodiment of the invention, there is provided a method of controlling a communication base station which can communicate with a positioning device which locates a position using satellite signals from a plurality of positioning satellites and is located at a fixed position, the method comprising:

calculating a propagation time required for a communication radio wave to propagate between the communication base station and the positioning device;

determining whether or not the propagation time is within a predetermined allowable time range;

receiving the satellite signals;

calculating a code phase of each of the satellite signals;

receiving a positioning-side code phase which is a code phase of each of the satellite signals calculated by the positioning device;

calculating a difference between the code phase calculated by the communication base station and the positioning-side code phase received from the positioning device;

determining whether or not the difference is within a multipath range which is a difference range when the positioning-side code phase is affected by a multipath; and transmitting the code phase calculated by the communication base station to the positioning device when the difference has been determined to be within the multipath range.

According to this configuration, the code phase at the base station can be provided to the positioning device which can communicate with the communication base station only when the condition is satisfied whereby it is appropriate for the positioning device to use the code phase at the base station.

According to one embodiment of the invention, there is provided a computer-readable recording medium storing a program for causing a computer included in a communication base station, which can communicate with a positioning device which locates a position using satellite signals from a plurality of positioning satellites and is located at a fixed position, to execute the above method.

According to one embodiment of the invention, there is provided a positioning device which can communicate with a communication base station located at a fixed position and locates a position using satellite signals from a plurality of positioning satellites, when the communication base station has determined that a propagation time required for a communication radio wave to propagate between the communication base station and the positioning device is within a predetermined allowable time range, and has calculated a difference between a code phase calculated by the communication base station based on the received satellite signal and a positioning-side code phase which is a code phase of each of the satellite signals calculated by the positioning device, and the difference is within a multipath range which is a difference range when the positioning-side code phase is affected by a multipath, the positioning device receiving the code phase calculated by the communication base station and locating a position using the code phase calculated by the communication base station and the positioning-side code phase.

According to this configuration, the positioning device can receive the code phase at the base station and locate the position using the received code phase only when the condition is satisfied whereby it is appropriate for the positioning device to use the code phase at the base station.

According to one embodiment of the invention, there is provided a positioning system comprising a positioning device which locates a position using satellite signals from a plurality of positioning satellites and a communication base station which can communicate with the positioning device, the communication base station including:

an initial position calculation section which calculates an initial position of the positioning device;

a code phase calculation section which calculates a code phase of the satellite signal at a position of the communication base station;

an estimated difference calculation section which estimates a difference between the code phase calculated by the code phase calculation section and a code phase of the satellite signal on assumption that the communication base station is located at the initial position as an estimated difference;

an estimated code phase calculation section which estimates the code phase on assumption that the communication base station is located at the initial position as an estimated code phase based on the code phase calculated by the code phase calculation section and the estimated difference; and a subsidiary information transmission section which transmits the initial position and the estimated code phase to the positioning device; and the positioning device including:

a terminal code phase calculation section which calculates a code phase at a position of the positioning device as a terminal code phase based on the satellite signal;

a code phase difference calculation section which calculates a code phase difference between the estimated code phase and the terminal code phase; and a positioning section which locates a position using the estimated code phase or the terminal code phase depending on the code phase difference.

According to this configuration, the communication base station can calculate the initial position of the positioning device. The communication base station can calculate the estimated difference.

The communication base station can calculate the estimated code phase at the initial position based on the code phase calculated based on the received satellite signal and the estimated difference. The positioning device can calculate the code phase difference between the estimated code phase and the terminal code phase. Since the positioning device can estimate the Doppler shift of the carrier carrying the satellite signal using the initial position, the positioning device can efficiently receive the satellite signal and promptly calculate the terminal code phase.

The positioning device can locate the position using the estimated code phase or the terminal code phase depending on the code phase difference.

For example, the positioning device can locate the position using the estimated code phase when the code phase difference is large enough to indicate occurrence of a multipath. The estimated code phase is not the code phase at the communication base station, but is the code phase estimated to be the code phase at the initial position of the positioning device. Therefore, the estimated code phase is closer to the true code phase of the positioning device than the code phase at the communication base station.

Therefore, the positioning system allows occurrence of a multipath to be determined and the position to be accurately located when a multipath occurs in comparison with the case of using the code phase at the communication base station.

In the positioning system, the initial position calculation section of the communication base station may calculate the initial position of the positioning device based on the position of the communication base station, a propagation time required for a communication radio wave to propagate between the communication base station and the positioning device, and a transmission direction of the communication radio wave.

According to one embodiment of the invention, there is provided a positioning device which locates a position using satellite signals from a plurality of positioning satellites, the positioning device comprising:

a base station position information acquisition section which acquires base station position information from a communication base station which can communicate with the positioning device, the base station position information indicating a position of the communication base station;

a transmission direction information acquisition section which acquires transmission direction information indicating a transmission direction of a communication radio wave transmitted from the communication base station to the positioning device;

a base station code phase acquisition section which acquires a base station code phase from the communication base station, the base station code phase being a code phase at a position of the communication base station calculated by the communication base station based on the satellite signal;

a propagation time calculation section which calculates a propagation time required for a communication radio wave to propagate between the communication base station and the positioning device;

an initial position calculation section which calculates an initial position of the positioning device based on the position of the communication base station, the transmission direction, and the propagation time;

an estimated difference calculation section which estimates a difference between the code phase at the position of the communication base station and a code phase of the satellite signal at the initial position as an estimated difference;

an estimated code phase calculation section which estimates the code phase at the initial position as an estimated code phase based on the base station code phase and the estimated difference;

a terminal code phase calculation section which calculates a code phase at a position of the positioning device as a terminal code phase based on the satellite signal;

a code phase difference calculation section which calculates a code phase difference between the estimated code phase and the terminal code phase; and a positioning section which locates a position using the estimated code phase or the terminal code phase depending on the code phase difference.

According to this configuration, the positioning device can calculate the initial position. Therefore, since the positioning device can estimate the Doppler shift of the carrier carrying the satellite signal using the initial position, the positioning device can efficiently receive the satellite signal. The positioning device can calculate the estimated difference. The positioning device can calculate the estimated code phase. The positioning device can also calculate the code phase difference between the estimated code phase and the terminal code phase.

The positioning device can locate the position using the estimated code phase or the terminal code phase depending on the code phase difference.

For example, the positioning device can locate the position using the estimated code phase when the code phase difference is large enough to indicate occurrence of a multipath. The estimated code phase is not the code phase at the communication base station, but is the code phase estimated to be the code phase at the initial position of the positioning device. Therefore, the estimated code phase is closer to the true code phase of the positioning device than the code phase at the communication base station. Therefore, the positioning device can determine occurrence of a multipath and accurately locate the position when a multipath occurs in comparison with the case of using the code phase at the communication base station.

According to one embodiment of the invention, there is provided a positioning device which locates a position using satellite signals from a plurality of positioning satellites, the positioning device comprising:

a base station position information acquisition section which acquires base station position information from a communication base station which can communicate with the positioning device, the base station position information indicating a position of the communication base station;

a base station code phase acquisition section which acquires a base station code phase from the communication base station, the base station code phase being a code phase at a position of the communication base station calculated by the communication base station based on the satellite signal;

an initial position calculation section which calculates an initial position utilizing communication radio waves from a plurality of the communication base stations;

an estimated difference calculation section which estimates a difference between the code phase at the position of the communication base station and a code phase of the satellite signal at the initial position as an estimated difference;

an estimated code phase calculation section which estimates the code phase at the initial position as an estimated code phase based on the base station code phase and the estimated difference;

a terminal code phase calculation section which calculates a code phase at a position of the positioning device as a terminal code phase based on the satellite signal;

a code phase difference calculation section which calculates a code phase difference between the estimated code phase and the terminal code phase; and a positioning section which locates a position using the estimated code phase or the terminal code phase depending on the code phase difference.

According to this configuration, since the positioning device can calculate the initial position using the communication radio waves from the communication base stations, the positioning device can determine occurrence of a multipath and accurately locate the position when a multipath occurs in comparison with the case of using the code phase at the communication base station.

According to one embodiment of the invention, there is provided a method of controlling a communication base station which can communicate with a positioning device which locates a position using satellite signals from a plurality of positioning satellites, the method comprising:

calculating an initial position of the positioning device;

calculating a code phase of the satellite signal;

estimating a difference between the calculated code phase and a code phase of the satellite signal calculated on assumption that the communication base station is located at the initial position as an estimated difference;

estimating the code phase of the satellite signal on assumption that the communication base station is located at the initial position as an estimated code phase based on the calculated code phase and the estimated difference; and transmitting the initial position and the estimated code phase to the positioning device.

According to this configuration, the communication base station can transmit the initial position and the estimated code phase to the positioning device. Therefore, the positioning device can calculate the code phase difference between the terminal code phase calculated based on the received satellite signal and the estimated code phase and locate the position using the estimated code phase or the terminal code phase depending on the code phase difference.

This allows occurrence of a multipath to be determined and the position to be accurately located when a multipath occurs in comparison with the case of using the code phase at the communication base station.

According to one embodiment of the invention, there is provided a computer-readable recording medium storing a program for causing a computer included in a communication base station, which can communicate with a positioning device which locates a position using satellite signals from a plurality of positioning satellites, to execute the above method.

Preferred embodiments of the invention are described below in detail with reference to the drawings and the like.

The following embodiments illustrate specific preferred examples of the invention and are provided with various technologically preferred limitations. Note that the scope of the invention is not limited to the following embodiments (modes or aspects) unless otherwise indicated.

FIG. 1 is a schematic view showing a positioning system 10 according to one embodiment of the invention.

As shown in FIG. 1, the positioning system 10 includes global positioning system (GPS) satellites 12a, 12b, 12c, 12d, 12e, and 12f. The GPS satellites 12a and the like can respectively transmit radio waves S1, S2, S3, S4, S5, and S6. The GPS satellites 12a and the like exemplify a positioning satellite.

The positioning satellite is not limited to the GPS satellite, but may be a satellite generally used in a satellite positioning system (SPS). The SPS includes the Galileo, a quasi-zenith satellite, and the like in addition to the GPS.

The radio waves S1 and the like carry various codes. A C/A code is one of such codes. The C/A code is a signal having a bit rate of 1.023 Mbps and a bit length of 1023 bits (=1 msec). The C/A code includes 1023 chips. The C/A code exemplifies a satellite signal.

The positioning system 10 includes a terminal 20A and a terminal 20B. The terminal 20A and the terminal 20B are generically called a terminal 20.

The terminal 20 is a portable telephone having a positioning function, and can locate the present position using the C/A code. The terminal 20 exemplifies a positioning device.

The terminal 20 can specify the code phases (phases) of the C/A codes from three or more different GPS satellites 12a and the like to calculate the pseudo-range between each of the GPS satellites 12a and the like and the terminal 20, and locate the present position using the calculated pseudo-ranges, for example.

Figure 2:
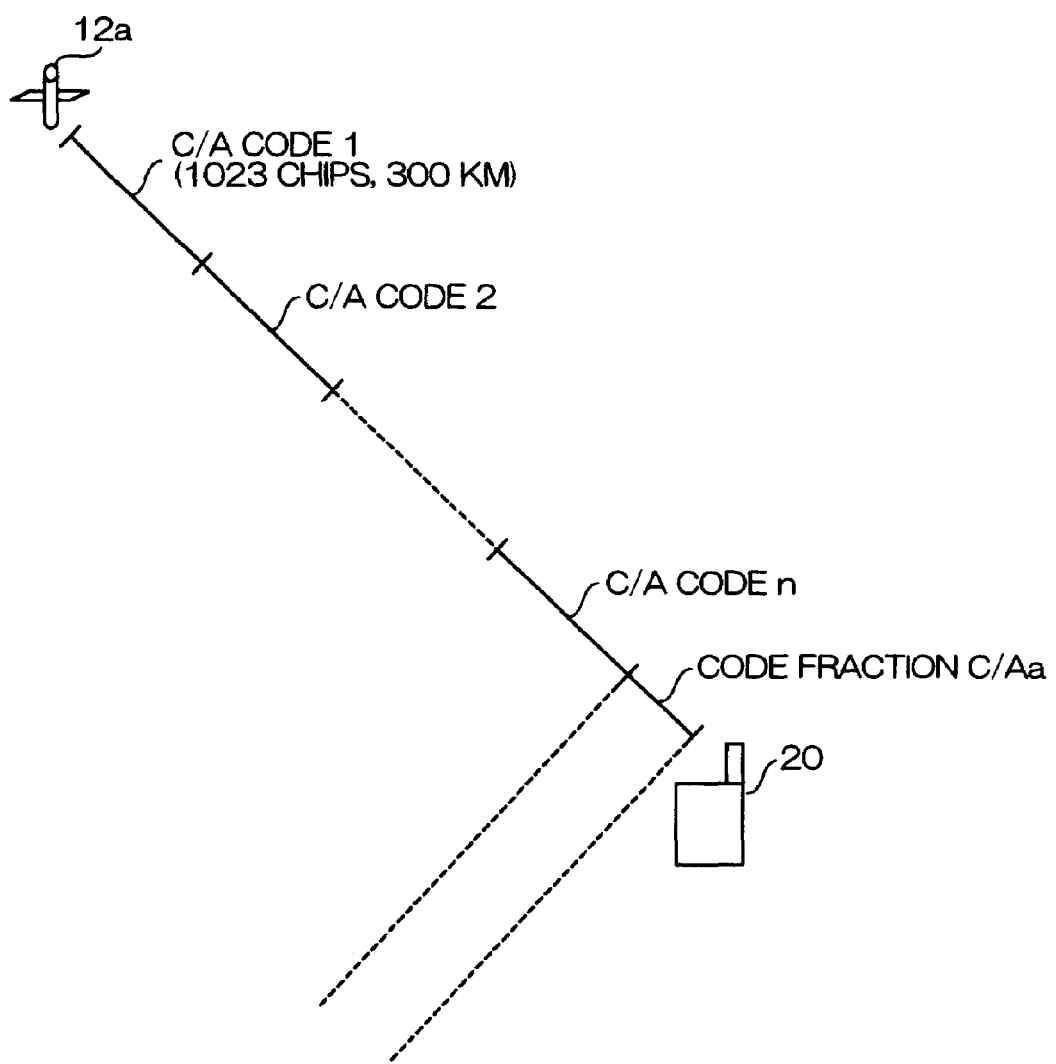
FIG. 2 is a schematic view showing a positioning method.

FIG. 2 is a schematic view showing an example of a positioning method.

As shown in FIG. 2, it may be considered that the C/A codes continuously line up between the GPS satellite 12a and the terminal 20, for example. Since the distance between the GPS satellite 12a and the terminal 20 is not necessarily a multiple of the length (about 300 kilometers (km)) of the C/A code, a code fraction C/Aa may exist. Specifically, a portion of a multiple of the C/A code and a fraction portion may exist between the GPS satellite 12a and the terminal 20. The total length of the portion of a multiple of the C/A code and the fraction portion is the pseudo-range. The terminal 20 locates the position using the pseudo-ranges for three or more GPS satellites 12a and the like.

In this specification, the fraction portion C/Aa of the C/A code is called a code phase (phase). The code phase may be indicated by the number of the chip of the 1023 chips of the C/A code, or may be converted into distance, for example.

The position of the GPS satellite 12a in the orbit can be calculated using an ephemeris. The ephemeris is information carried on the radio waves S1 and the like and indicating the precise orbit of each of the GPS satellites 12a and the like. The portion of a multiple of the C/A code can be specified by calculating the distance between the position of the GPS satellite 12a in the orbit and an initial position Q0 (not shown), for example. Since the length of the C/A code is about 300 kilometers (km), the position error of the initial position Q0 must be 150 kilometers (km) or less.

The terminal 20 performs a correlation process including a coherent process and an incoherent process.

When the coherent time of the coherent process is 5 msec, the terminal 20 calculates the correlation value of the C/A code synchronously accumulated over 5 msec and a C/A code replica and the like. The correlated code phase and the correlation value are output as a result of the coherent process.

In the incoherent process, the terminal 20 calculates the correlation cumulative value (incoherent value) by accumulating the correlation values as the coherent results.

The code phase at which the correlation cumulative value becomes maximum is the code fraction C/Aa.

The positioning system 10 also includes a base station 40. The base station 40 can communicate with the terminal 20. The base station 40 is a communication base station in a portable telephone system, and is located at a fixed position. The coordinates of the fixed position are known. The fixed position at which the base station 40 is located is an open sky environment in which no obstacle exists around the base station 40. Therefore, the base station 40 can receive the radio wave S3 from the GPS satellite 12c as a direct wave r1, for example. The base station 40 exemplifies a communication base station.

The base station 40 can arbitrate communication between the terminal 20 and another terminal through a dedicated line 65.

The base station 40 includes a GPS receiver 42, and can receive the radio waves S1 and the like from the GPS satellites 12a and the like.

The base station 40 can calculate the code phase of the C/A code. The base station 40 transmits and receives communication radio waves using four antennas 54a, 54b, 54c, and 54d, for example. The four antennas 54a and the like respectively transmit the communication radio waves in four different directions such as the north, south, east, and west, and receive the communication radio waves from the terminal 20. The transmission direction of the communication radio wave is also called a cell sector.

The base station 40 can identify the direction of the antenna through which the base station 40 transmits the communication radio wave to the terminal 20 which communicates with the base station 40.

When no obstacle exists around the terminal 20 such as in the case of the position of the terminal 20A, the radio wave S3 reaches the terminal 20A as a direct wave r2, for example.

When obstacles such as buildings 13A and 13B exist around the terminal 20 such as in the case of the position of the terminal 20B, the radio wave S3 is reflected by the building 13B and reaches the terminal 20B as an indirect wave (multipath wave) r3, for example.

Since the propagation path of the multipath wave r3 is longer than that of the direct wave, the terminal 20B calculates the code phase to be longer than that of the direct wave. As a result, the accuracy of the located position deteriorates.

The base station 40 can assist the terminal 20B to locate the position with high accuracy by transmitting the code phase calculated by the base station 40 in order to correct the code phase calculated by the terminal 20B under the influence of the multipath only when the code phase calculated based on the received direct wave r1 and the period of time (round trip time (RTT)) required for the communication radio wave to make a round trip between the base station 40 and the terminal 20 satisfy specific necessary conditions.

Since the propagation velocity of the communication radio wave is known (speed of light), the base station 40 can calculate the distance d between the base station 40 and the terminal 20B using the RTT.

The base station 40 transmits and receives the communication radio waves using four antennas (not shown), for example. The four antennas respectively transmit the communication radio waves in four different directions such as the north, south, east, and west, and receive the communication radio waves from the terminal 20. The base station 40 can identify the direction of the antenna through which the terminal 20 receives the communication radio wave from the base station 40.

Two embodiments relating to the above-described schematic configuration are given below. A positioning system 1010 according to a first embodiment and a positioning system 2010 according to a second embodiment correspond to the positioning system 10 in the above-described schematic configuration. A terminal 1020 according to the first embodiment and a terminal 2020 according to the second embodiment correspond to the terminal 20 in the above-described schematic configuration. A base station 1040 according to the first embodiment and a base station 2040 according to the second embodiment correspond to the base station 40 in the above-described schematic configuration.

First Embodiment

The first embodiment is described below.

(Main Hardware Configuration of Terminal 1020)

Figure 3:
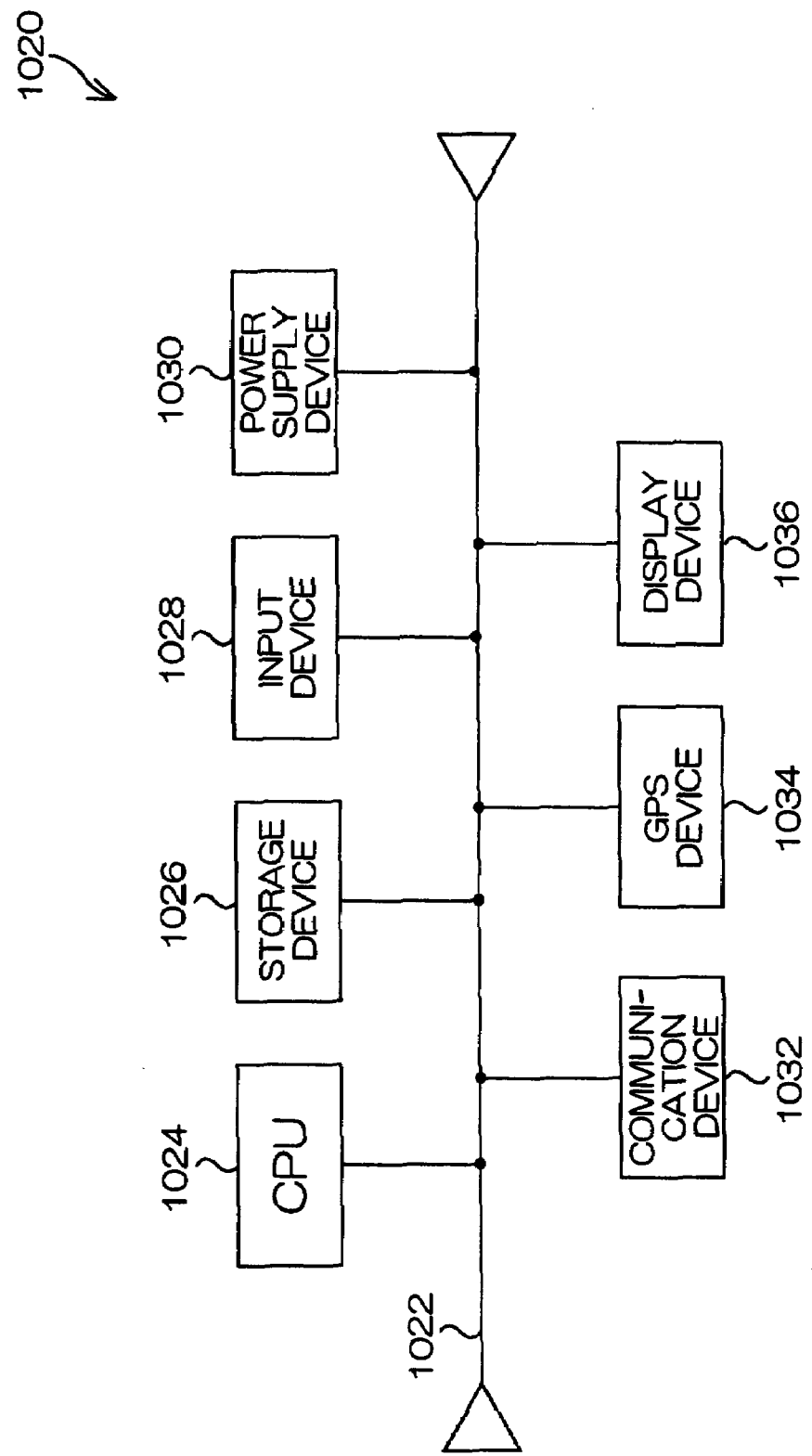
FIG. 3 is a schematic view showing the main hardware configuration of a terminal.

FIG. 3 is a schematic view showing the main hardware configuration of the terminal 1020.

As shown in FIG. 3, the terminal 1020 includes a bus 1022.

A central processing unit (CPU) 1024, a storage device 1026, and the like are connected with the bus 1022. The storage device 1026 is a random access memory (RAM), a read only memory (ROM), or the like.

An input device 1028 for inputting various types of information and the like, a power supply device 1030, a communication device 1032, and a GPS device 1034 are also connected with the bus 1022. The terminal 1020 can receive the radio waves S1 and the like using the GPS device 1034.

A display device 1036 for displaying various types of information is also connected with the bus 1022.

(Main Hardware Configuration of Base Station 1040)

Figure 4:
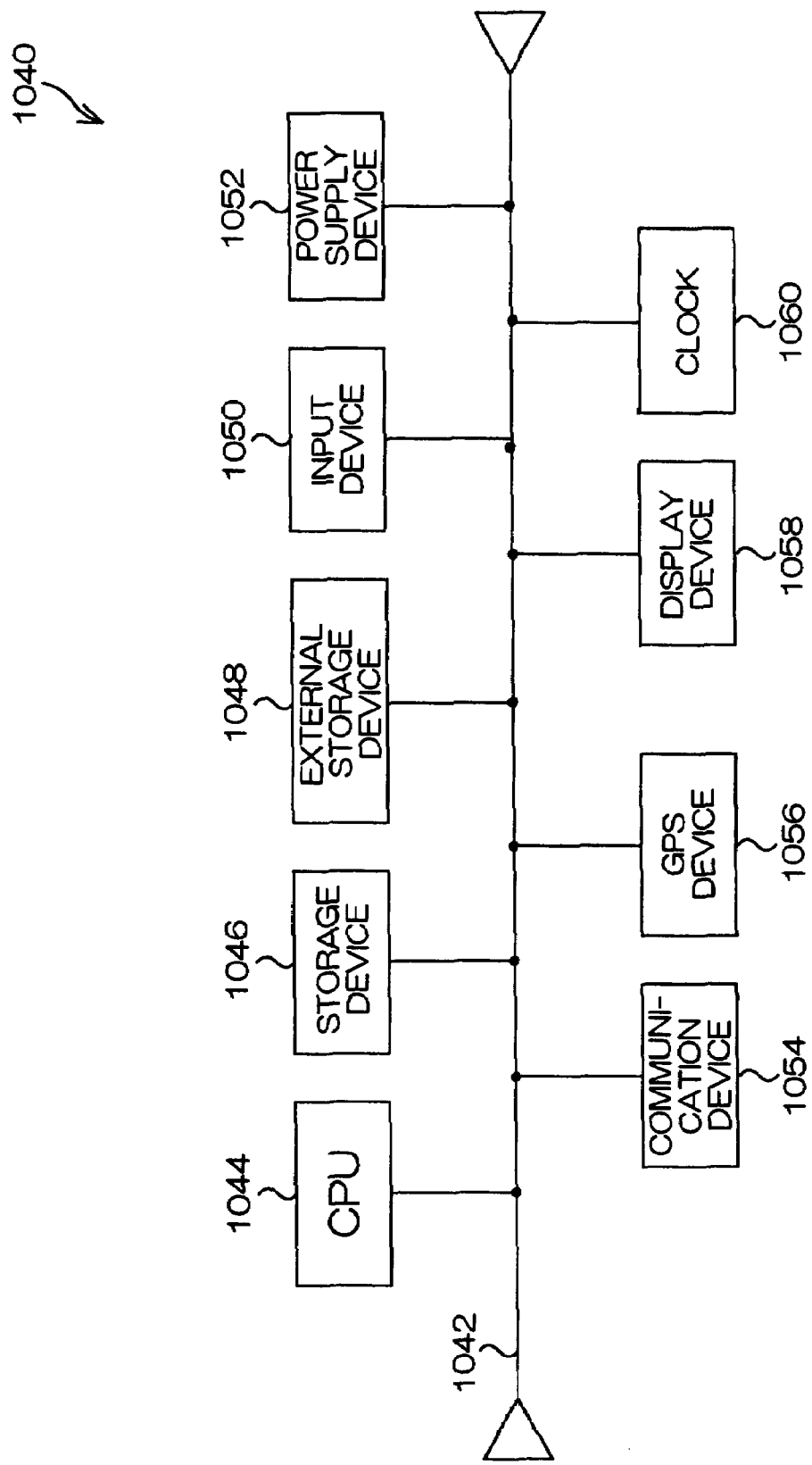
FIG. 4 is a schematic view showing the main hardware configuration of a base station.

FIG. 4 is a schematic view showing the main hardware configuration of the base station 1040.

As shown in FIG. 4, the base station 1040 includes a bus 1042.

A CPU 1044, a storage device 1046, an external storage device 1048, and the like are connected with the bus 1042. The external storage device 1048 is a hard disk drive (HDD) or the like.

An input device 1050 for inputting various types of information and the like, a power supply device 1052, a communication device 1054, a GPS device 1056, a display device 1058, and a clock 1060 are also connected with the bus 1042.

The base station 1040 can identify one of four antennas through which a specific terminal 1020 transmits and receives the communication radio wave.

The base station 1040 can measure the RTT (see FIG. 1) using the clock 1060.

(Main Software Configuration of Terminal 1020)

Figures 5, 6:
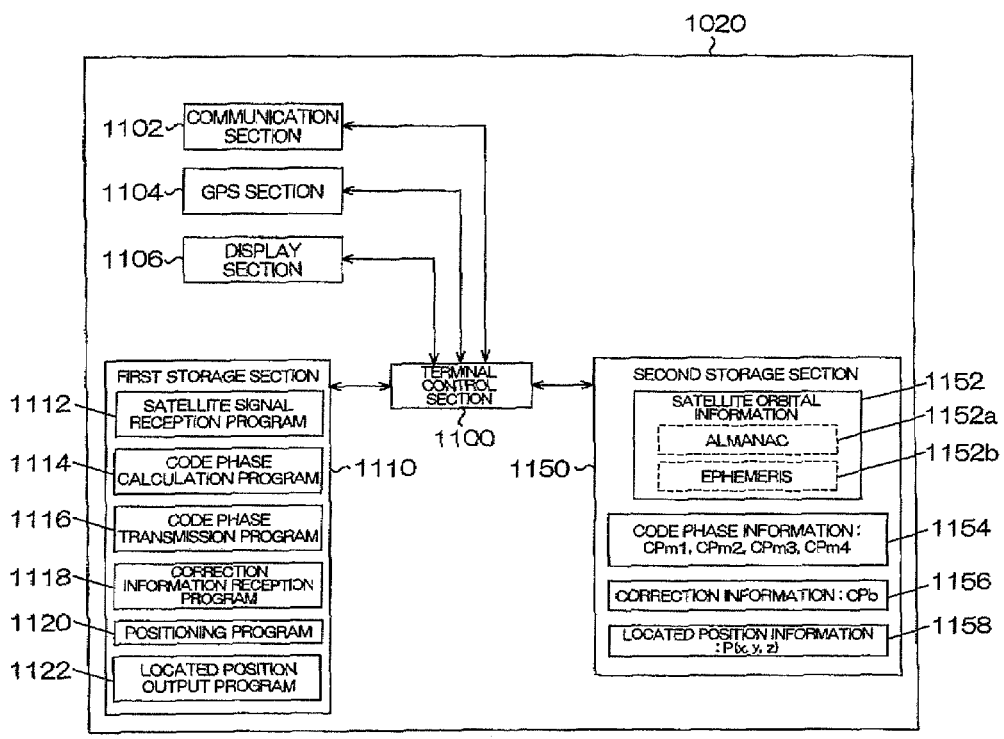
FIG. 5 is a schematic view showing the main software configuration of the terminal.
FIG. 6 is a view illustrative of a positioning program.

FIG. 5 is a schematic view showing the main software configuration of the terminal 1020.

As shown in FIG. 5, the terminal 1020 includes a terminal control section 1100 which controls each section, a communication section 1102 corresponding to the communication device 1032 shown in FIG. 3, a GPS section 1104 corresponding to the GPS device 1034, a display section 1106 corresponding to the display device 1036, and the like.

The terminal 1020 also includes a first storage section 1110 which stores various programs, and a second storage section 1150 which stores various types of information.

As shown in FIG. 5, the terminal 1020 stores satellite orbital information 1152 in the second storage section 1150. The satellite orbital information 1152 includes an almanac 1152a and an ephemeris 1152b.

The almanac 1152a is information indicating the approximate orbits of all of the GPS satellites 12a and the like (see FIG. 1). The almanac 1152a can be acquired by decoding any of the waves S1 and the like from the GPS satellites 12a and the like.

The ephemeris 1152b is information indicating the precise orbit of each of the GPS satellites 12a and the like (see FIG. 1). For example, when acquiring the ephemeris 1152b of the GPS satellite 12a, it is necessary to receive and decode the waves S1 from the GPS satellite 12a.

The terminal 1020 utilizes the satellite orbital information 1152 for positioning.

As shown in FIG. 5, the terminal 1020 stores a satellite signal reception program 1112 in the first storage section 1110. The satellite signal reception program 1112 is a program for causing the control section 1100 to receive the radio waves S1 and the like from the GPS satellites 12a and the like.

In more detail, the control section 1100 determines the GPS satellites 12a and the like which can be observed at the present time referring to the almanac 1152a, and receives the radio waves S1 and the like from the observable GPS satellites 12a and the like. In this case, the position of the base station 1040 is used as the reference position of the terminal 1020, for example. The terminal 1020 can acquire information indicating the position of the base station 1040 from the base station 1040 with which the terminal 1020 communicates.

As shown in FIG. 5, the terminal 1020 stores a code phase calculation program 1114 in the first storage section 1110. The code phase calculation program 1114 is a program for causing the terminal control section 1100 to calculate the code phase of the C/A code in units of the GPS satellites 12a and the like.

For example, the terminal control section 1100 calculates a code phase CPm1 of the GPS satellite 12a, a code phase CPm2 of the GPS satellite 12b, a code phase CPm3 of the GPS satellite 12c, and a code phase CPm4 of the GPS satellite 12d.

The terminal control section 1100 stores code phase information 1154 indicating the code phases CPm1 and the like in the second storage section 1150. The code phases CPm1 and the like are generically called a terminal code phase CPm.

As shown in FIG. 5, the terminal 1020 stores a code phase transmission program 1116 in the first storage section 1110. The code phase transmission program 1116 is a program for causing the terminal control section 1100 to transmit the code phase information 1154 to the base station 1040.

As shown in FIG. 5, the terminal 1020 stores a correction information reception program 1118 in the first storage section 1110. The correction information reception program 1118 is a program for causing the terminal control section 1100 to receive a base station code phase CPb from the base station 1040.

The base station code phase CPb is information provided by the base station 1040 when the radio wave S1 or the like received by the terminal 1020 is a multipath wave.

The terminal control section 1100 stores correction information 1156 indicating the base station code phase CPb in the second storage section 1150.

As shown in FIG. 5, the terminal 1020 stores a positioning program 1120 in the first storage section 1110. The positioning program 1120 is a program for causing the terminal control section 1100 to locate the present position using the code phase information 1154 and the correction information 1156.

FIG. 6 is a view illustrative of the process based on the positioning program 1120.

As shown in FIG. 6, when the terminal 1020 has received the base station code phase CPb3 for only the GPS satellite 12c, for example, the terminal control section 1100 uses the code phases CPm1, CPm2, and CPm4 calculated by the terminal 1020 for the GPS satellites 12a, 12b, and 12d. The terminal control section 1100 uses the base station code phase CPb3 for the GPS satellite 12c instead of the code phase CPm3.

The terminal control section 1100 locates the present position using the code phases CPm1, CPm2, CPm4, and CPb3, and calculates a located position P.

The terminal control section 1100 stores located position information 1158 indicating the calculated located position P in the second storage section 1150.

As shown in FIG. 5, the terminal 1020 stores a located position output program 1122 in the first storage section 1110. The located position output program 1122 is a program for causing the terminal control section 1100 to display the located position P on the display device 1036 (see FIG. 3).

(Main Software Configuration of Base Station 1040)

Figure 7:
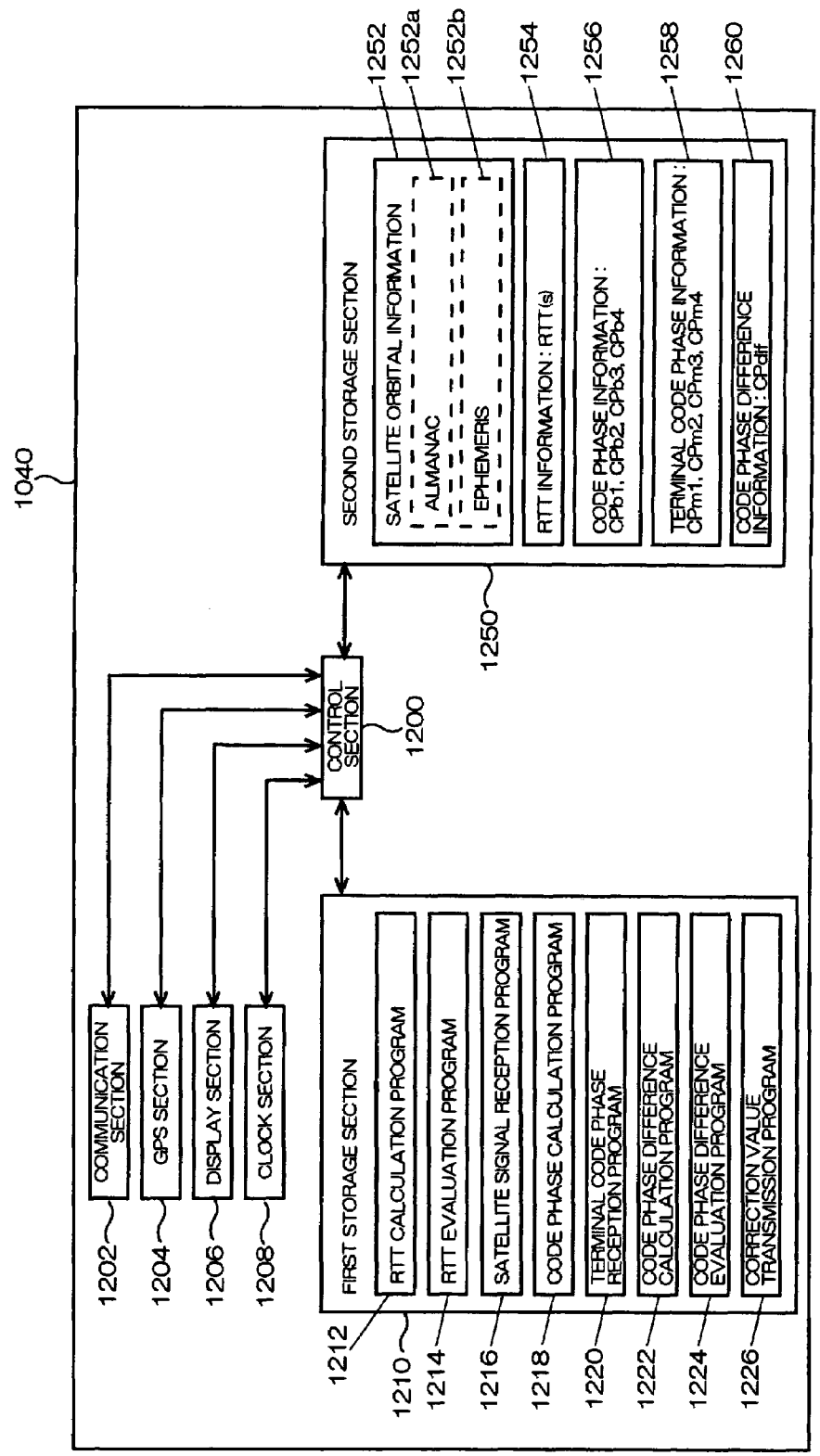
FIG. 7 is a schematic view showing the main software configuration of the base station.

FIG. 7 is a schematic view showing the main software configuration of the base station 1040.

As shown in FIG. 7, the base station 1040 includes a control section 1200 which controls each section, a communication section 1202 corresponding to the communication device 1054 shown in FIG. 4, a GPS section 1204 corresponding to the GPS device 1056, a display section 1206 corresponding to the display device 1058, a clock section 1208 corresponding to the clock 1060, and the like.

The base station 1040 also includes a first storage section 1210 which stores various programs, and a second storage section 1250 which stores various types of information.

As shown in FIG. 7, the base station 1040 stores satellite orbital information 1252 in the second storage section 1250. The satellite orbital information 1252 includes an almanac 1252a and an ephemeris 1252b.

As shown in FIG. 7, the base station 1040 stores an RTT calculation program 1212 in the first storage section 1210. The RTT calculation program 1212 is a program for causing the control section 1200 to calculate a propagation time (RTT) required for the communication radio wave to propagate between the base station 1040 and the terminal 1020. The RTT calculation program 1212 and the control section 1200 exemplify a propagation time calculation section.

In more detail, the control section 1200 transmits a specific frame (hereinafter called "base station frame") to the terminal 1020, and receives a frame (hereinafter called "terminal frame") transmitted from the terminal 1020 corresponding to the base station frame. The control section 1200 calculates the RTT by measuring the transmission time of the specific base station frame and the reception time of the terminal frame corresponding to the base station frame using the clock section 1208.

As described above, the control section 1200 calculates the round trip time (RTT) required for the communication radio wave to make a round trip between the base station 1040 and the terminal 1020.

The control section 1200 stores RTT information 1254 indicating the calculated RTT in the second storage section 1250.

As shown in FIG. 7, the base station 1040 stores an RTT evaluation program 1214 in the first storage section 1210. The RTT evaluation program 1214 is a program for causing the control section 1200 to determine whether or not the RTT is equal to or less than a predetermined time threshold value $\alpha$. The time threshold value $\alpha$ is 0.7 microseconds ($\mu$m), for example. A time range equal to or less than the time threshold value $\alpha$ exemplifies an allowable time range. The RTT evaluation program 1214 and the control section 1200 exemplify a propagation time evaluation section.

The time threshold value $\alpha$ is specified as a period of time by which the control section 1200 determines that the terminal 1020 is located in the communication area (also called "cell") of the base station 1040 and is sufficiently close to the base station 1040. In other words, the time range indicated by the time threshold value $\alpha$ is specified as a time range when the base station 1040 and the terminal 1020 are so close that the positions of the base station 1040 and the terminal 1020 are considered to be almost identical.

When the RTT is 0.7 microseconds ($\mu$m), the period of time required for the communication radio wave to reach the terminal 1020 from the base station 1040 is 0.35 (0.7/2) microseconds ($\mu$m). Since the communication radio wave propagates at the speed of light (about 299792.456 m/ms), the distance between the base station 1040 and the terminal 1020 is about 105 meters (m). The above distance is specified as a distance appropriate for the base station 1040 to transmit the calculated code phase to the terminal 1020 and the terminal 1020 to locate the position using the code phase calculated by the base station 1040 when the base station 1040 has determined that the code phase calculated by the terminal 1020 is affected by a multipath as a result of a comparison between the code phase calculated by the base station 1040 and the code phase calculated by the terminal 1020, as described later.

As shown in FIG. 7, the base station 1040 stores a satellite signal reception program 1216 in the first storage section 1210. The satellite signal reception program 1216 is a program for causing the control section 1200 to receive the radio waves S1 and the like from the GPS satellites 12a and the like. The satellite signal reception program 1216 and the control section 1200 exemplify a satellite signal reception section.

The satellite signal reception program 1216 is the same as the satellite signal reception program 1112 of the terminal 1020 (see FIG. 5).

As shown in FIG. 7, the base station 1040 stores a code phase calculation program 1218 in the first storage section 1210. The code phase calculation program 1218 is a program for causing the control section 1200 to calculate the code phase of the C/A code in units of the GPS satellites 12a and the like. The code phase calculation program 1218 and the control section 1200 exemplify a code phase calculation section.

For example, the control section 1200 calculates a code phase CPb1 of the GPS satellite 12a, a code phase CPb2 of the GPS satellite 12b, a code phase CPb3 of the GPS satellite 12c, and a code phase CPb4 of the GPS satellite 12d.

When the RTT is equal to or less than the predetermined time threshold value α, the distance between the base station 1040 and the terminal 1020 is very short. Therefore, the base station 1040 can receive the radio waves S1 and the like from the GPS satellites 12a and the like almost the same as the GPS satellites 12a and the like used by the terminal 1020 to calculate the code phases, and calculate the code phases.

Since the base station 1040 receives the radio waves S1 and the like in an open sky environment (i.e., the reception state of the radio waves S1 and the like is good), the code phases CPb1 and the like are not affected by a multipath and have an extremely high accuracy. The code phases CPb1 and the like are generically called a code phase CPb.

The control section 1200 stores code phase information 1258 indicating the code phases CPb1 and the like in the second storage section 1250.

As shown in FIG. 7, the base station 1040 stores a terminal code phase reception program 1220 in the first storage section 1210. The terminal code phase reception program 1220 is a program for causing the control section 1200 to receive the terminal code phase information 1154 (see FIG. 5) from the terminal 1020. The terminal code phase reception program 1220 and the control section 1200 exemplify a positioning-side code phase reception section.

The control section 1200 stores the received terminal code phase information 1154 in the second storage section 1250 as the terminal code phase information 1258.

As shown in FIG. 7, the base station 1040 stores a code phase difference calculation program 1222 in the first storage section 1210. The code phase difference calculation program 1222 is a program for causing the control section 1200 to calculate a difference CPdif between the base station code phase CPb1 or the like and the terminal code phase CPm1 or the like. The difference CPdif exemplifies a difference. The code phase difference calculation program 1222 and the control section 1200 exemplify a difference calculation section.

FIG. 8 is a view illustrative of the process based on the code phase difference calculation program 1222.

FIG. 8 schematically shows a code phase comparison.

The control section 1200 calculates the difference CPdif in units of the GPS satellites 12a and the like. For example, the control section 1200 calculates the difference between the base station code phase CPb1 of the GPS satellite 12a and the terminal code phase CPm1 of the GPS satellite 12a. As shown in FIG. 8, the control section 1200 calculates the difference CPdif in chips such as c1 chips or c2 chips. The chip is a basic unit forming the C/A code.

The control section 1200 stores code phase difference information 1260 indicating the calculated difference CPdif in the second storage section 1250.

As shown in FIG. 7, the base station 1040 stores a code phase difference evaluation program 1224 in the first storage section 1210. The code phase difference evaluation program 1224 is a program for causing the control section 1200 to determine whether or not the difference CPdif is equal to or greater than a threshold value β. The threshold value β is one chip, for example. When the difference CPdif is equal to or greater than the threshold value β, the terminal side code phase used to calculate the difference CPdif may be affected by a multipath. In other words, a difference range equal to or greater than the threshold value β is specified as a difference range when the terminal side code phase is affected by a multipath.

A range equal to or greater than the threshold value β exemplifies a difference range. The code phase difference evaluation program 1224 and the control section 1200 exemplify a difference evaluation section.

When the control section 1200 has determined that the RTT is equal to or less than the threshold value α based on the RTT evaluation program, the control section 1200 operates based on the satellite signal reception program 1216, the code phase calculation program 1218, the terminal code phase reception program 1220, the code phase difference calculation program 1222, and the code phase difference evaluation program 1224.

As shown in FIG. 7, the base station 1040 stores a correction value transmission program 1226 in the first storage section 1210. The correction value transmission program 1226 is a program for causing the control section 1200 to transmit the base station code phase CPb1 or the like of the corresponding GPS satellite 12a or the like to the terminal 1020 when the control section 1200 has determined that the difference CPdif is equal to or greater than the threshold value β. The correction value transmission program 1226 and the control section 1200 exemplify a correction value transmission section.

The positioning system 1010 is configured as described above.

As described above, the base station 1040 can determine whether or not the RTT is equal to or less than the threshold value α. Therefore, the base station 1040 can identify whether or not the terminal 1020 is close to the base station 1040 in addition to whether or not the terminal 1020 is positioned in the communication area (cell) of the base station 1040.

The base station 1040 can calculate the difference CPdif between the code phase CPb calculated by the base station 1040 and the terminal code phase CPm. Since the true positions of the base station 1040 and the terminal 1020 usually differ even if the base station 1040 is close to the terminal 1020, the difference CPdif includes the difference due to the difference in true position, the difference due to an error caused by a factor other than a multipath, and the difference due to an error caused by a multipath.

When the base station 1040 has determined that the difference CPdif is equal to or greater than the threshold value β, the base station 1040 can transmit the code phase CPb calculated by the base station 1040 to the terminal 1020.

Since the base station 1040 can identify whether or not the terminal 1020 is positioned close to the base station 1040, as described above, the base station 1040 can transmit the base station code phase CPb1 or the like to the terminal 1020 when the base station 1040 has determined that the condition is satisfied whereby the terminal 1020 is positioned very close to the base station 1040 and that the difference CPdif is equal to or greater than the threshold value β. When the condition is satisfied whereby the terminal 1020 is positioned very close to the base station 1040, the terminal code phase CPm should be almost the same as the base station code phase CPb when the terminal code phase CPm is not affected by a multipath. Therefore, it is appropriate for the terminal 1020 to use the base station code phase CPb for positioning. It is also appropriate for the terminal 1020 to locate the position using the base station code phase CPb calculated by the nearby base station 1040 instead of the terminal code phase CPm calculated by the terminal 1020 using a multipath signal. Specifically, the positioning accuracy of the terminal 1020 is likely to be improved.

This allows the base station 1040 to provide the base station code phase CPb to the terminal 1020 which can communicate with the base station 1040 only when the condition is satisfied whereby it is appropriate for the terminal 1020 to use the base station code phase CPb.

The configuration of the positioning system 1010 according to this embodiment has been described above. An operation example of the positioning system 1010 is described below mainly using FIG. 9.

Figure 9:
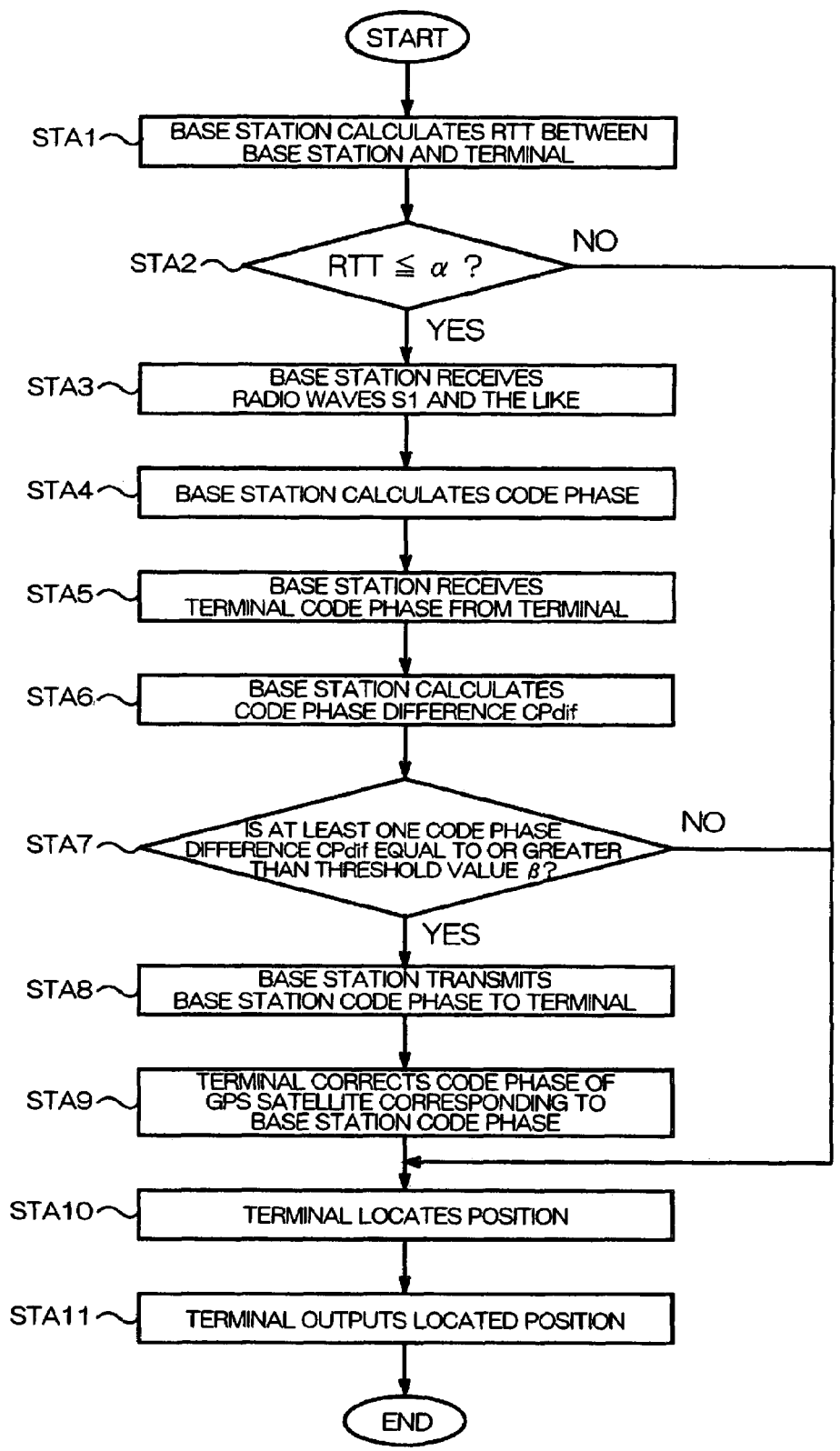
FIG. 9 is a schematic flowchart showing an operation example of the positioning system.

FIG. 9 is a schematic flowchart showing an operation example of the positioning system 1010.

The base station 1040 calculates the RTT between the base station 1040 and the terminal 1020 (step STA1 in FIG. 9). The step STA1 exemplifies a propagation time calculation step.

The base station 1040 determines whether or not the RTT is equal to or less than the threshold value α (step STA2). The step STA2 exemplifies a propagation time evaluation step.

When the base station 1040 has determined that the RTT is equal to or less than the threshold value α, the base station 1040 receives the radio waves S1 and the like (step STA3). The step STA3 exemplifies a satellite signal reception step.

The base station 1040 calculates the code phase CPb (step STA4). The step STA4 exemplifies a code phase calculation step.

The base station 1040 receives the terminal code phase CPm from the terminal 1020 (step STA5). The step STA5 exemplifies a positioning-side code phase reception step.

The base station 1040 calculates the code phase difference CPdif (step STA6). The step STA6 exemplifies a difference calculation step.

The base station 1040 determines whether or not at least one code phase difference CPdif is equal to or greater than the threshold value β (step STA7). The step STA7 exemplifies a difference evaluation step.

When the base station 1040 has determined that at least one code phase difference CPdif is equal to or greater than the threshold value β, the base station 1040 transmits the base station code phase CPb1 or the like of the corresponding GPS satellite 12a or the like to the terminal 1020 (step STA8). The step STA8 exemplifies a correction value transmission step.

The terminal corrects the terminal code phase CPm1 or the like of the GPS satellite 12a or the like corresponding to the base station code phase CPb1 or the like with the base station code phase CPb1 (step STA9).

The terminal 1020 locates the position (step STA10). In the step STA10, the terminal 1020 locates the position using the base station code phase CPb for the GPS satellite for which the base station code phase CPb has been received, and locates the position using the terminal code phase CPm for the GPS satellite for which the base station code phase CPb has not been received.

The terminal 1020 outputs the located position P (step STA11).

When the base station 1040 has determined that the RTT is greater than the time threshold value α in the step STA2, the base station 1040 notifies the terminal 1020 that the base station 1040 does not transmit the base station code phase CPb.

When a code phase difference CPdif equal to or greater than the threshold value β does not exist in the step STA7, the base station 1040 also notifies the terminal 1020 that the base station 1040 does not transmit the base station code phase CPb.

The base station 1040 can provide the base station code phase CPb to the terminal 1020 which can communicate with the base station 1040 only when the condition is satisfied whereby it is appropriate for the terminal 1020 to use the base station code phase CPb.

The terminal 1020 can accurately locate the position using the base station code phase CPb for the GPS satellite for which the base station code phase CPb has been received and using the terminal code phase CPm for the GPS satellite for which the base station code phase CPb has not been received.

(Program, Computer-readable Recording Medium, and the Like)

A program for controlling a communication base station may be provided which causes a computer to execute the propagation time calculation step, the propagation time evaluation step, the satellite signal reception step, the code phase calculation step, the positioning-side code phase reception step, the difference calculation step, the difference evaluation step, and the correction value transmission step, and the like of the above-described operation example.

A computer-readable recording medium or the like may also be provided which stores such a program for controlling a communication base station or the like.

A program storage medium used to install the program for controlling a communication base station or the like in a computer to allow the program or the like to be executable by the computer may be implemented by a package medium such as a flexible disk such as a floppy disk®, a compact disk read only memory (CD-ROM), a compact disk-recordable (CD-R), a compact disk-rewritable (CD-RW), or a digital versatile disk (DVD), a semiconductor memory, a magnetic disk, or a magnetooptical disk in which the program is stored temporarily or permanently, or the like.

The first embodiment has been described above. Note that the control section 1200 of the base station 1040 may transmit the RTT information 1254 (see FIG. 7) and the code phase information 1256 to the terminal 1020, and the terminal 1020 may calculate the code phase difference CPdif, differing from this embodiment.

Second Embodiment

A second embodiment is described below.

(Main Hardware Configuration of Base Station 2040)

Figure 10:
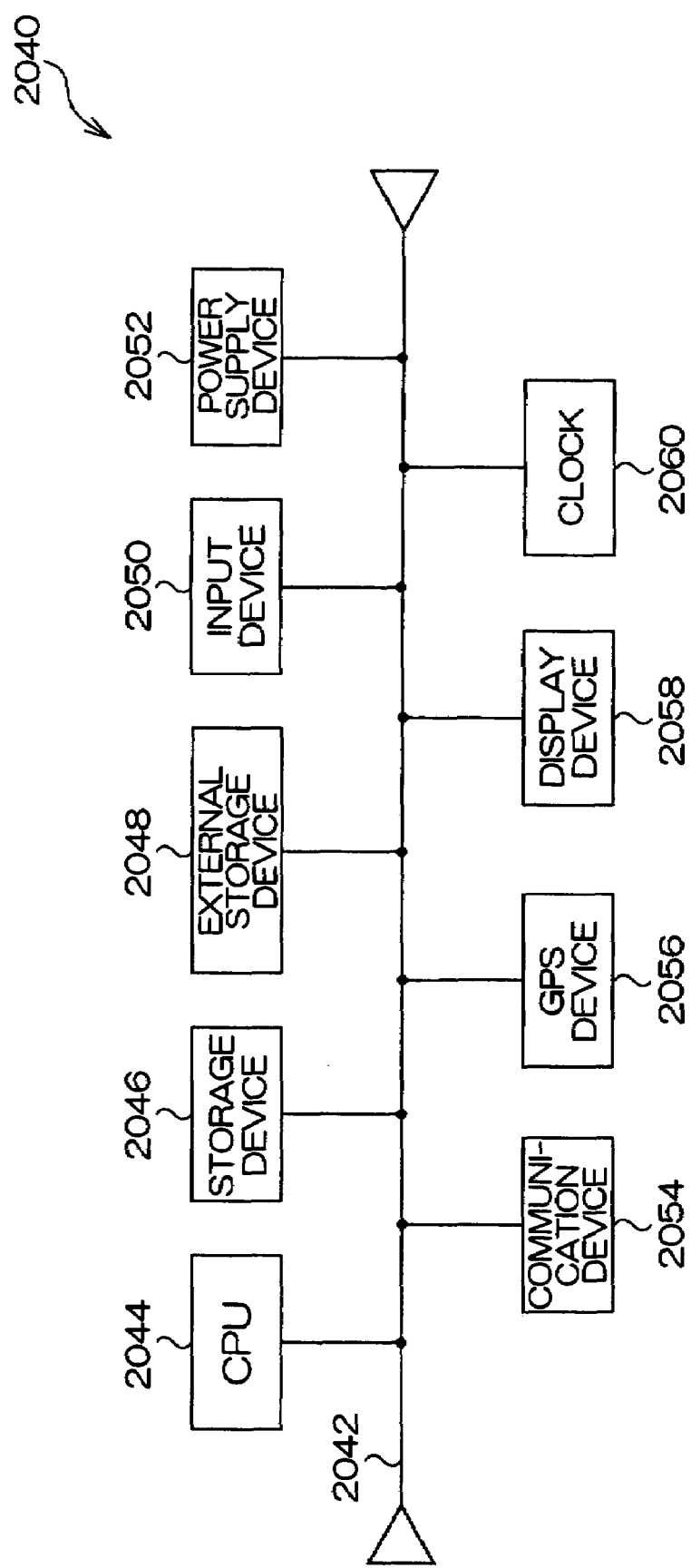
FIG. 10 is a schematic view showing the main hardware configuration of another base station.

FIG. 10 is a schematic view showing the main hardware configuration of a base station 2040.

As shown in FIG. 10, the base station 2040 includes a bus 2042.

A central processing unit (CPU) 2044, a storage device 2046, an external storage device 2048, and the like are connected with the bus 2042. The storage device 2046 is a random access memory (RAM), a read only memory (ROM), or the like. The external storage device 2048 is a hard disk drive (HDD) or the like.

An input device 2050 for inputting various types of information and the like, a power supply device 2052, a communication device 2054, a GPS device 2056, a display device 2058, and a clock 2060 are also connected with the bus 2042.

The base station 2040 can measure the round trip time (RTT) (see FIG. 1) using the clock 2060. The RTT is the period of time required for the communication radio wave to make a round trip between the base station 2040 and a terminal 2020. The half of the RTT is the propagation time required for the communication radio wave to propagate between the base station 2040 and the terminal 2020.

(Main Hardware Configuration of Terminal 2020)

Figure 11:
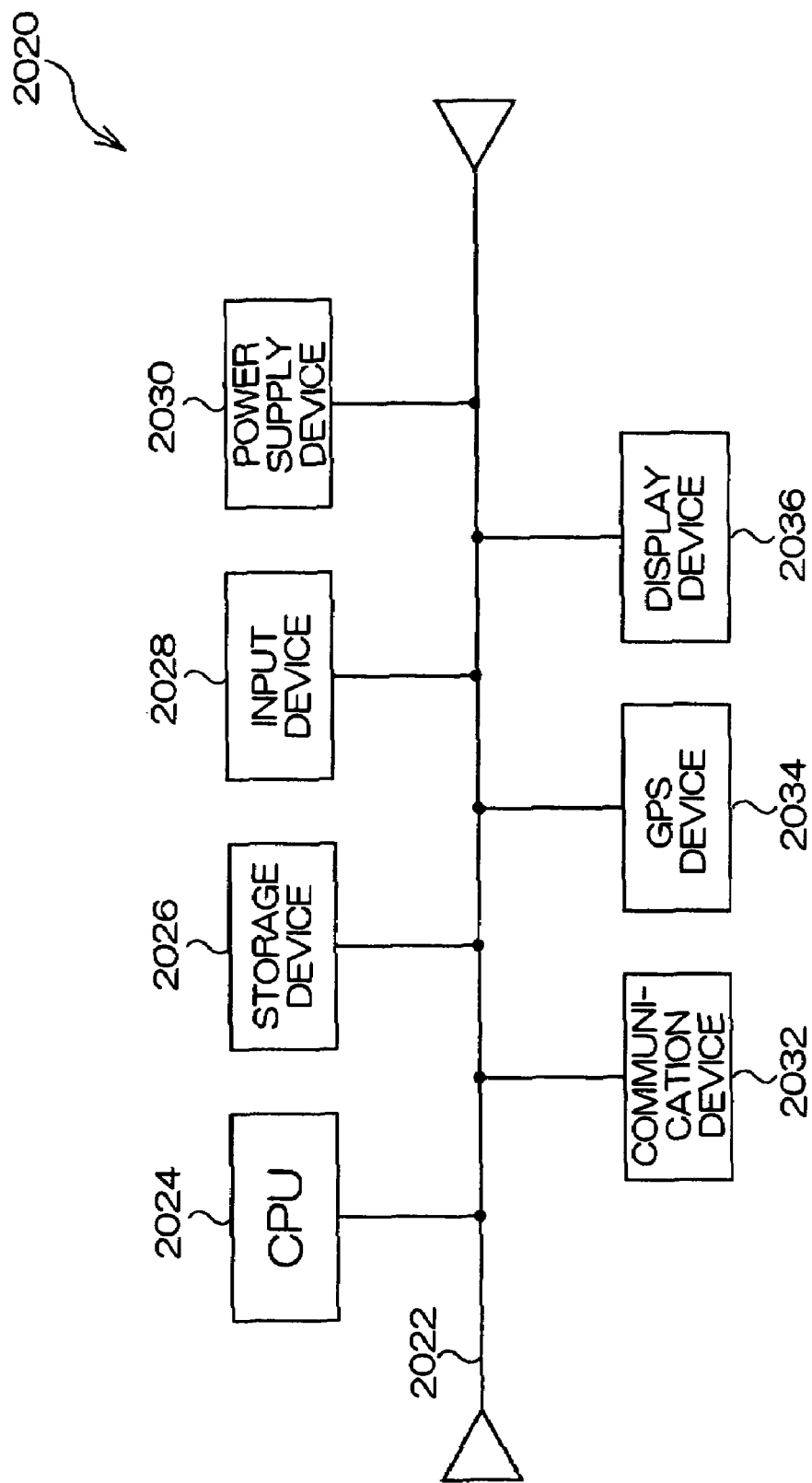
FIG. 11 is a schematic view showing the main hardware configuration of another terminal.

FIG. 11 is a schematic view showing the main hardware configuration of the terminal 2020.

As shown in FIG. 11, the terminal 2020 includes a bus 2022.

A CPU 2024, a storage device 2026, and the like are connected with the bus 2022.

An input device 2028 for inputting various types of information and the like, a power supply device 2030, a communication device 2032, and a GPS device 2034 are also connected with the bus 2022. The terminal 2020 can receive the radio waves S1 and the like using the GPS device 2034.

A display device 2036 for displaying various types of information is also connected with the bus 2022.

(Main Software Configuration of Base Station 2040)

Figure 12:
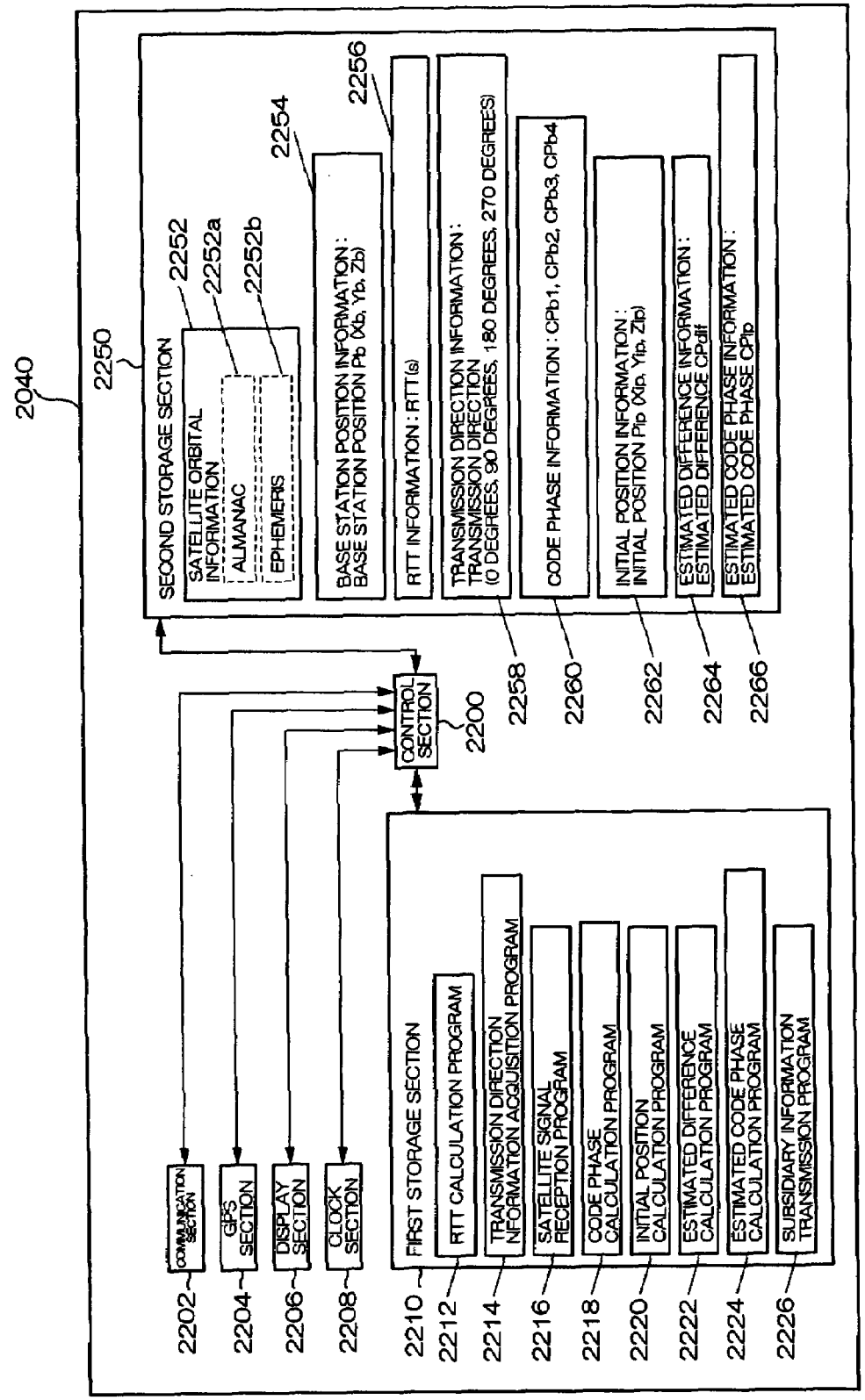
FIG. 12 is a schematic view showing the main software configuration of the base station.

FIG. 12 is a schematic view showing the main software configuration of the base station 2040.

As shown in FIG. 12, the base station 2040 includes a control section 2200 which controls each section, a communication section 2202 corresponding to the communication device 2054 shown in FIG. 10, a GPS section 2204 corresponding to the GPS device 2056, a display section 2206 corresponding to the display device 2058, a clock section 2208 corresponding to the clock 2060, and the like.

The base station 2040 also includes a first storage section 2210 which stores various programs, and a second storage section 2250 which stores various types of information.

As shown in FIG. 12, the base station 2040 stores satellite orbital information 2252 in the second storage section 2250. The satellite orbital information 2252 includes an almanac 2252a and an ephemeris 2252b. The almanac 2252a is information indicating the approximate orbits of all of the GPS satellites 12a and the like (see FIG. 1). The almanac 2252a can be acquired by decoding any of the signals carried on the radio waves S1 and the like from the GPS satellites 12a and the like.

The ephemeris 2252b is information indicating the precise orbit of each of the GPS satellites 12a and the like (see FIG. 1). For example, when acquiring the ephemeris 2252b of the GPS satellite 12a, it is necessary to receive and decode the radio wave S1 from the GPS satellite 12a.

As shown in FIG. 12, the base station 2040 stores base station position information 2254 in the second storage section 2250. The base station position information 2254 is information indicating the position of the base station 2040 located at a fixed position by means of latitude, longitude, and height.

As shown in FIG. 12, the base station 2040 stores an RTT calculation program 2212 in the first storage section 2210. The RTT calculation program 2212 is a program for causing the control section 2200 to calculate the propagation time (RTT) required for the communication radio wave to propagate between the base station 2040 and the terminal 2020. The RTT calculation program 2212 and the control section 2200 exemplify a propagation time calculation section.

In more detail, the control section 2200 transmits a specific frame (hereinafter called "base station frame") to the terminal 2020, and receives a frame (hereinafter called "terminal frame") transmitted from the terminal 2020 corresponding to the base station frame. The control section 2200 calculates the RTT by measuring the transmission time of the specific base station frame and the reception time of the terminal frame corresponding to the base station frame using the clock section 2208.

As described above, the control section 2200 calculates the round trip time (RTT) required for the communication radio wave to make a round trip between the base station 2040 and the terminal 2020.

The control section 2200 stores RTT information 2256 indicating the calculated RTT in the second storage section 2250.

As shown in FIG. 12, the base station 2040 stores a transmission direction information acquisition program 2214 in the first storage section 2210. The transmission direction information acquisition program 2214 is a program for causing the control section 2200 to acquire information indicating the transmission direction of the communication radio wave transmitted to the terminal 2020 which communicates with the base station 2040.

In more detail, the control section 2200 specifies the transmission direction by specifying one of the antennas 54a and the like used to transmit the communication radio wave to the terminal 2020. As the transmission direction, the north is indicated by 0 degrees, the east is indicated by 90 degrees, the south is indicated by 180 degrees, and the west is indicated by 270 degrees.

The control section 2200 stores transmission direction information 2258 indicating the transmission direction in the second storage section 2250.

As shown in FIG. 12, the base station 2040 stores a satellite signal reception program 2216 in the first storage section 2210. The satellite signal reception program 2216 is a program for causing the control section 2200 to receive the radio waves S1 and the like from the GPS satellites 12a and the like.

In more detail, the control section 2200 determines the GPS satellites 12a and the like which can be observed at the present time referring to the almanac 2252a, and receives the radio waves S1 and the like from the observable GPS satellites 12a and the like. In this case, a base station position Pb is used as the reference position of the base station 2040.

As shown in FIG. 12, the base station 2040 stores a code phase calculation program 2218 in the first storage section 2210. The code phase calculation program 2218 is a program for causing the control section 2200 to calculate the code phase of the C/A code in units of the GPS satellites 12a and the like.

For example, the control section 2200 calculates the code phase CPb1 of the GPS satellite 12a, the code phase CPb2 of the GPS satellite 12b, the code phase CPb3 of the GPS satellite 12c, and the code phase CPb4 of the GPS satellite 12d.

Since the base station 2040 receives the radio waves S1 and the like in an open sky environment (i.e., the reception state of the radio waves S1 and the like is good), the code phases CPb1 and the like are not affected by a multipath and have an extremely high accuracy. The code phases CPb1 and the like are generically called a code phase CPb.

The control section 2200 stores code phase information 2260 indicating the code phases CPb1 and the like in the second storage section 2250.

As shown in FIG. 12, the base station 2040 stores an initial position calculation program 2220 in the first storage section 2210. The initial position calculation program 2220 is a program for causing the control section 2200 to calculate an initial position Pip of the terminal 2020. The initial position calculation program 2220 and the control section 2200 exemplify an initial position calculation section.

The terminal 2020 uses the initial position Pip as an initial estimated position when locating the position. The terminal 2020 uses the initial position Pip when calculating the observable GPS satellites 12a and the like or calculating the Doppler shift of the radio waves S1 and the like from the GPS satellites 12a and the like, for example.

Figure 13:
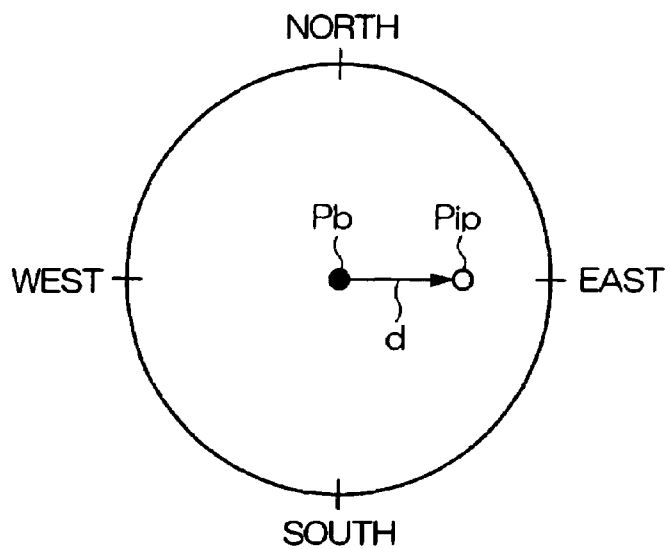
FIG. 13 is a view illustrative of a process based on an initial position calculation program.

FIG. 13 is a view illustrative of the process based on the initial position calculation program 2220.

The control section 2200 calculates the distance d between the base station 2040 and the terminal 2020 according to an expression 1 shown in FIG. 13. Since the propagation time required for the communication radio wave to propagate from the base station 2040 to the terminal 2020 is half of the RTT, the distance d can be calculated by multiplying the half of the RTT by the propagation velocity (speed of light) of the communication radio wave.

The control section 2200 calculates the position apart from the base station position Pb by the distance d in the transmission direction θ as the initial position Pip. Since the transmission direction θ is two-dimensional, a height Zb of the base station position Pb is used as the height of the initial position Pip.

The control section 2200 stores initial position information 2262 indicating the calculated initial position Pip (Xip, Yip, Zip) in the second storage section 2250. The height Zip is equal to the height Zb of the base station position Pb, as described above.

As shown in FIG. 12, the base station 2040 stores an estimated difference calculation program 2222 in the first storage section 2210. The estimated difference calculation program 2222 is a program for causing the control section 2200 to calculate the estimated difference CPdif between the code phase of a specific GPS satellite at the base station 2040 and the code phase at the initial position Pip of the terminal 2020. The estimated difference calculation program 2222 and the control section 2200 exemplify an estimated difference calculation section.

FIG. 14 is a view illustrative of the process based on the estimated difference calculation program 2222.

The control section 2200 calculates an estimated difference Timedif in delay time according to an expression 2 shown in FIG. 14. The control section 2200 calculates the satellite position Ps (Xs, Ys, Zs) of the GPS satellite 12a in the orbit at the present time referring to the ephemeris 2252b, for example. The control section 2200 calculates the difference between the distance between the satellite position Ps and the base station position Pb and the distance between the satellite position Ps and the initial position Pip of the terminal 2020. The control section 2200 calculates the estimated difference Timedif in delay time by dividing the difference in distance by the propagation velocity (speed of light) of the radio waves S1 and the like. The unit for the estimated difference Timedif is milliseconds (msec).

The C/A code is a signal having a bit rate of 1.023 Mbps and a bit length of 1023 bits (=1 msec), as described above. Therefore, the estimated difference CPdif can be calculated by multiplying the estimated difference Timedif by 1023.

The control section 2200 stores estimated difference information 2264 indicating the calculated estimated difference CPdif in the second storage section 2250.

As shown in FIG. 12, the base station 2040 stores an estimated code phase calculation program 2224 in the first storage section 2210. The estimated code phase calculation program 2224 is a program for causing the control section 2200 to calculate an estimated code phase CPip based on the estimated difference CPdif and the base station code phase CPb or the like calculated based on the received radio wave S1 or the like. The estimated code phase CPip exemplifies an estimated code phase.

FIG. 15 is a view illustrative of the process based on the estimated code phase calculation program 2224.

When an angle of elevation ELVb of a specific GPS satellite at the base station position Pb is larger than an angle of elevation ELVip at the initial position Pip, the control section 2200 calculates the estimated code phase CPip by adding the estimated difference CPdif to the base station code phase CPb according to an expression 4A. When the angle of elevation ELVb is larger than the angle of elevation ELVip, the distance between a specific satellite and the base station 2040 is shorter than the distance between the satellite and the terminal 2020. Therefore, the sign of the estimated difference CPdif becomes positive.

When the angle of elevation ELVb of a specific GPS satellite at the base station position Pb is smaller than the angle of elevation ELVip at the initial position Pip, the control section 2200 calculates the estimated code phase CPip by subtracting the estimated difference CPdif from the base station code phase CPb according to an expression 4B. When the angle of elevation ELVb is smaller than the angle of elevation ELVip, the distance between a specific satellite and the base station 2040 is longer than the distance between the satellite and the terminal 2020. Therefore, the sign of the estimated difference CPdif becomes negative.

The control section 2200 stores the calculated estimated code phase CPip in the second storage section 2250. Note that the sign of the estimated difference CPdif may be determined during the calculation process according to the expression 2 shown in FIG. 14, differing from this embodiment. Specifically, since the difference between the distance between a specific GPS satellite and the base station position Pb and the distance between the GPS satellite and the terminal 2020 is calculated during the calculation process according to the expression 2 shown in FIG. 14, these distances can be compared. When the distance between a specific GPS satellite and the base station position Pb is longer than the distance between the GPS satellite and the terminal 2020, the sign of the estimated difference CPdif becomes negative. On the other hand, when the distance between a specific GPS satellite and the base station position Pb is shorter than the distance between the GPS satellite and the terminal 2020, the sign of the estimated difference CPdif becomes positive.

As shown in FIG. 12, the base station 2040 stores a subsidiary information transmission program 2226 in the first storage section 2210. The subsidiary information transmission program 2226 is a program for causing the control section 2200 to transmit the initial position information 2262 and the estimated code phase information 2266 to the terminal 2020. The subsidiary information transmission program 2226 and the control section 2200 exemplify a subsidiary information transmission section.

The main software configuration of the base station 2040 has been described above.

The main software configuration of the terminal 2020 is described below.

(Main Software Configuration of Terminal 2020)

FIG. 16 is a schematic view showing the main software configuration of the terminal 2020.

As shown in FIG. 16, the terminal 1020 includes a terminal control section 2100 which controls each section, a communication section 2102 corresponding to the communication device 2032 shown in FIG. 11, a GPS section 2104 corresponding to the GPS device 2034, a display section 2106 corresponding to the display device 2036, and the like.

The terminal 2020 also includes a first storage section 2110 which stores various programs, and a second storage section 2150 which stores various types of information.

As shown in FIG. 16, the terminal 2020 stores satellite orbital information 2152 in the second storage section 2150. The satellite orbital information 2152 includes an almanac 2152a and an ephemeris 2152b.

The terminal 2020 utilizes the satellite orbital information 2152 for positioning.

As shown in FIG. 16, the terminal 2020 stores a satellite signal reception program 2112 in the first storage section 2110. The satellite signal reception program 2112 is a program for causing the terminal control section 2100 to receive the radio waves S1 and the like from the GPS satellites 12a and the like.

The satellite signal reception program 2112 is the same as the satellite signal reception program 2216 of the base station 2040 except that the terminal control section 2100 uses the initial position Pip as the initial position for receiving the radio waves S1 and the like. Specifically, the terminal control section 2100 uses the initial position Pip as the initial position for calculating the observable GPS satellites 12a and the like, and also uses the initial position Pip for calculating the reception frequencies of the radio waves from the GPS satellites 12a and the like. The reception frequency includes the Doppler shift.

As shown in FIG. 16, the terminal 2020 stores a code phase calculation program 2114 in the first storage section 2110. The code phase calculation program 2114 is a program for causing the terminal control section 2100 to receive the radio waves S1 and the like and calculate the code phase of the C/A code in units of the GPS satellites 12a and the like. The code phase calculation program 2114 and the terminal control section 2100 exemplify a terminal code phase calculation section.

For example, the terminal control section 2100 calculates the code phase CPm1 of the GPS satellite 12a, the code phase CPm2 of the GPS satellite 12b, the code phase CPm3 of the GPS satellite 12c, and the code phase CPm4 of the GPS satellite 12d.

The terminal control section 2100 stores code phase information 2154 indicating the code phases CPm1 and the like in the second storage section 2150. The code phases CPm1 and the like are generically called a terminal code phase CPm.

As shown in FIG. 16, the terminal 2020 stores a subsidiary information reception program 2116 in the first storage section 2110. The subsidiary information reception program 2116 is a program for causing the terminal control section 2100 to receive the initial position information 2262 (see FIG. 12) and the estimated code phase information 2266 (see FIG. 12) from the base station 2040.

The terminal control section 2100 stores the received initial position information 2262 in the second storage section 2150 as initial position information 2156. The terminal control section 2100 stores the received estimated code phase information 2266 in the second storage section 2150 as estimated code phase information 2158.

As shown in FIG. 16, the terminal 2020 stores a code phase difference calculation program 2118 in the first storage section 2110. The code phase difference calculation program 2118 is a program for causing the terminal control section 2100 to calculate the code phase difference CPer between the estimated code phase CPip and the terminal code phase CPm. The code phase difference CPer exemplifies a code phase difference. The code phase difference calculation program 2118 and the terminal control section 2100 exemplify a code phase difference calculation section.

FIGS. 17A and 17B are views illustrative of the process based on the code phase difference calculation program 2118.

As shown in FIG. 17A, the terminal control section 2100 calculates the code phase difference CPer by calculating the difference between the estimated code phase CPip and the terminal code phase CPm and indicating the difference by the absolute value according to an expression 5.

As shown in FIG. 17B, the terminal control section 2100 calculates the code phase difference CPer in units of the GPS satellites 12a and the like. For example, the code phase difference Cpera of the GPS satellite 12a is c1 chips, and the code phase difference Cperb of the GPS satellite 12b is c2 chips.

The terminal control section 2100 stores code phase difference information 2160 indicating the calculated code phase difference CPper in the second storage section 2150.

As shown in FIG. 16, the terminal 2020 stores a positioning program 2120 in the first storage section 2110. The positioning program 2120 is a program for causing the terminal control section 2100 to locate the position using the estimated code phase CPip or the terminal code phase CPm depending on the code phase difference CPer. The positioning program 2120 and the terminal control section 2100 exemplify a positioning section.

FIGS. 18A and 18B are views illustrative of the process based on the positioning program 2120.

As shown in FIG. 18A, the terminal control section 2100 uses the terminal code phase CPm for a satellite of which the code phase difference Cper is less than a threshold value α. When the code phase difference Cper is less than the threshold value α, it is considered that the radio wave S1 or the like from the GPS satellite is not a multipath wave. Therefore, the terminal control section 2100 uses the terminal code phase CPm calculated based on the actually received signal S1 or the like. The threshold value α is specified as a value which allows occurrence of a multipath to be determined depending on the accuracy of the initial position Pip.

The threshold value α according to this embodiment is two chips, for example. The C/A code includes 1023 chips. When the estimated code phase CPip and the terminal code phase CPm differ by two chips or more, the terminal control section 2100 determines that the terminal code phase CPm is calculated using a multipath signal.

The threshold value α may be set to be smaller as the accuracy of the initial position Pip becomes higher. Since the initial position Pip is specified by the RTT and the transmission direction of the communication radio wave, the accuracy of the initial position Pip increases as the transmission direction is more accurately identified. Therefore, the threshold value α may be set at 1.5 chips when the number of transmission directions is eight (north, northeast, east, southeast, south, southwest, west, and northwest), and may be set at 1 chip when the number of transmission directions is sixteen, differing from this embodiment. Whether or not the terminal code phase CPm is affected by a multipath can be more accurately determined as the accuracy of the initial position Pip increases and the threshold value α decreases.

On the other hand, the terminal control section 2100 uses the estimated code phase CPip for a satellite of which the code phase difference Cper is equal to or greater than the threshold value α. When the code phase difference Cper is equal to or greater than the threshold value α, it is considered that the radio wave S1 or the like from the GPS satellite is a multipath wave. Therefore, the terminal control section 2100 uses the estimated code phase CPip.

For example, when the terminal control section 2100 locates the position using the GPS satellites 12a, 12b, 12c, and 12d and only the code phase difference CPer corresponding to the GPS satellite 12c is equal to or greater than the threshold value α, the terminal control section 2100 locates the position using the terminal code phases CPma, CPmb, and CPmd and the estimated code phase CPipc, as shown in FIG. 18B.

The terminal control section 2100 stores located position information 2162 indicating the calculated located position P1 in the second storage section 2150.

As shown in FIG. 16, the terminal 2020 stores a located position output program 2122 in the first storage section 2110. The located position output program 2122 is a program for causing the terminal control section 2100 to display the located position P1 on the display device 2036 (see FIG. 11).

The positioning system 2010 is configured as described above.

As described above, the base station 2040 can calculate the initial position Pip of the terminal 2020.

The base station 2040 can calculate the estimated difference CPdif.

The base station 2040 can calculate the estimated code phase CPip at the initial position Pip of the terminal 2020 based on the code phase CPb calculated based on the radio wave S1 or the like and the estimated difference CPdif.

The terminal 2020 can calculate the code phase difference CPer between the estimated code phase CPip and the terminal code phase CPm. Since the terminal 2020 can estimate the Doppler shift of the radio wave S1 or the like carrying the C/A code using the initial position Pip, the terminal 2020 can efficiently receive the C/A code and promptly calculate the terminal code phase CPm.

The terminal 2020 can locate the position using the estimated code phase CPip or the terminal code phase CPm depending on the code phase difference CPer.

For example, the terminal 2020 can locate the position using the estimated code phase CPip when the code phase difference CPer is large enough to indicate occurrence of a multipath. The estimated code phase CPip is not the code phase at the base station 2040, but is the code phase estimated to be the code phase at the initial position Pip of the terminal 2020. Specifically, the initial position Pip is closer to the true position of the terminal 2020 than the position of the base station 2040.

Therefore, the estimated code phase CPip is closer to the true code phase of the terminal 2020 than the base station code phase CPb.

Therefore, the positioning system 2020 allows occurrence of a multipath to be determined and the position to be accurately located when a multipath occurs in comparison with the case of using the code phase at the communication base station. Moreover, since the initial position Pip is closer to the true position of the terminal 2020 than the position of the base station 2040, the calculation result of the positioning calculations is rapidly obtained. Specifically, the time to first fix (TTFF) is reduced.

The configuration of the positioning system 2010 according to this embodiment has been described above. An operation example of the positioning system 2010 is described below mainly using FIGS. 19 and 20.

Figure 19:
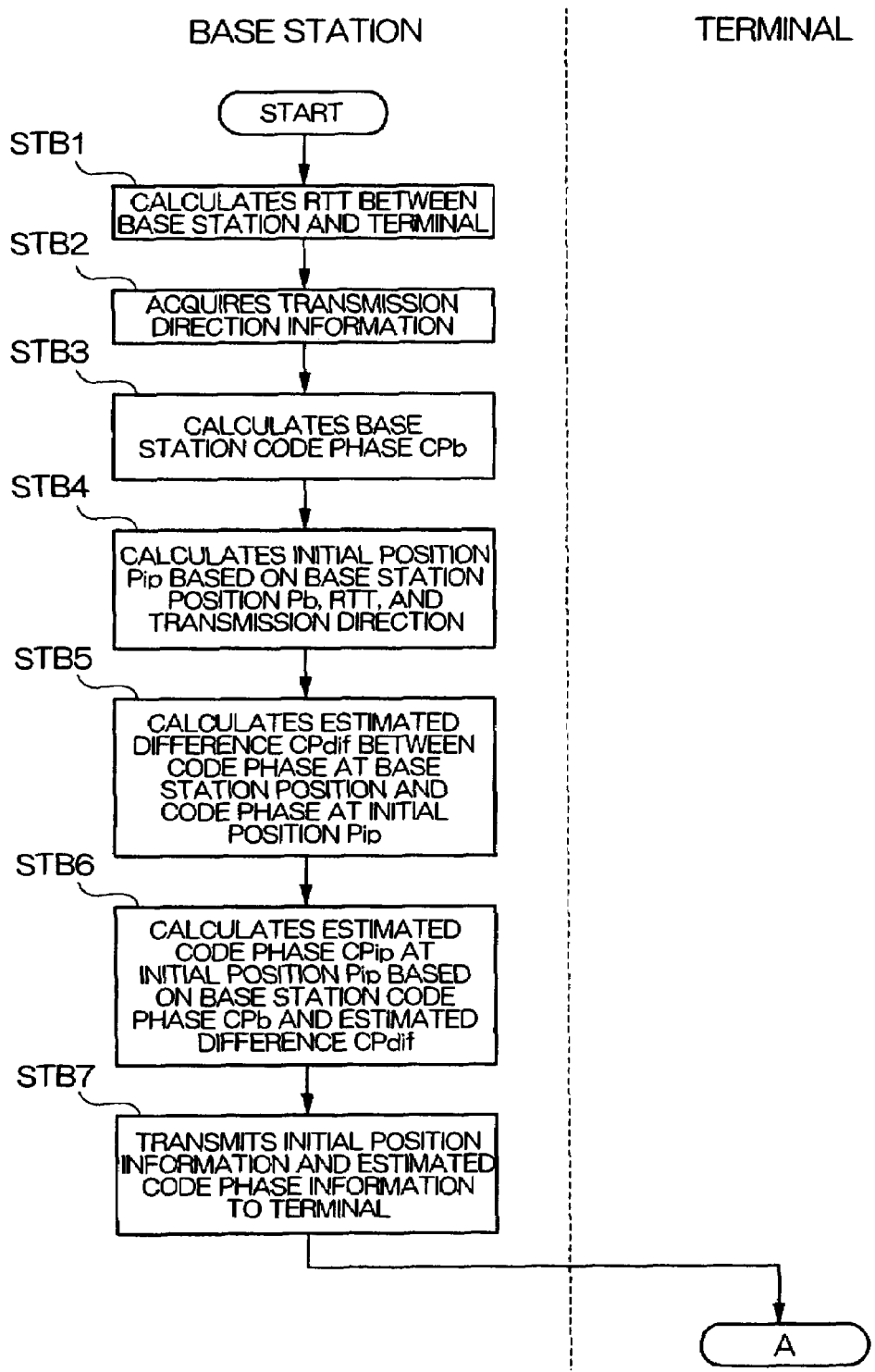
FIG. 19 is a schematic flowchart showing an operation example of the positioning system.
Figure 20:
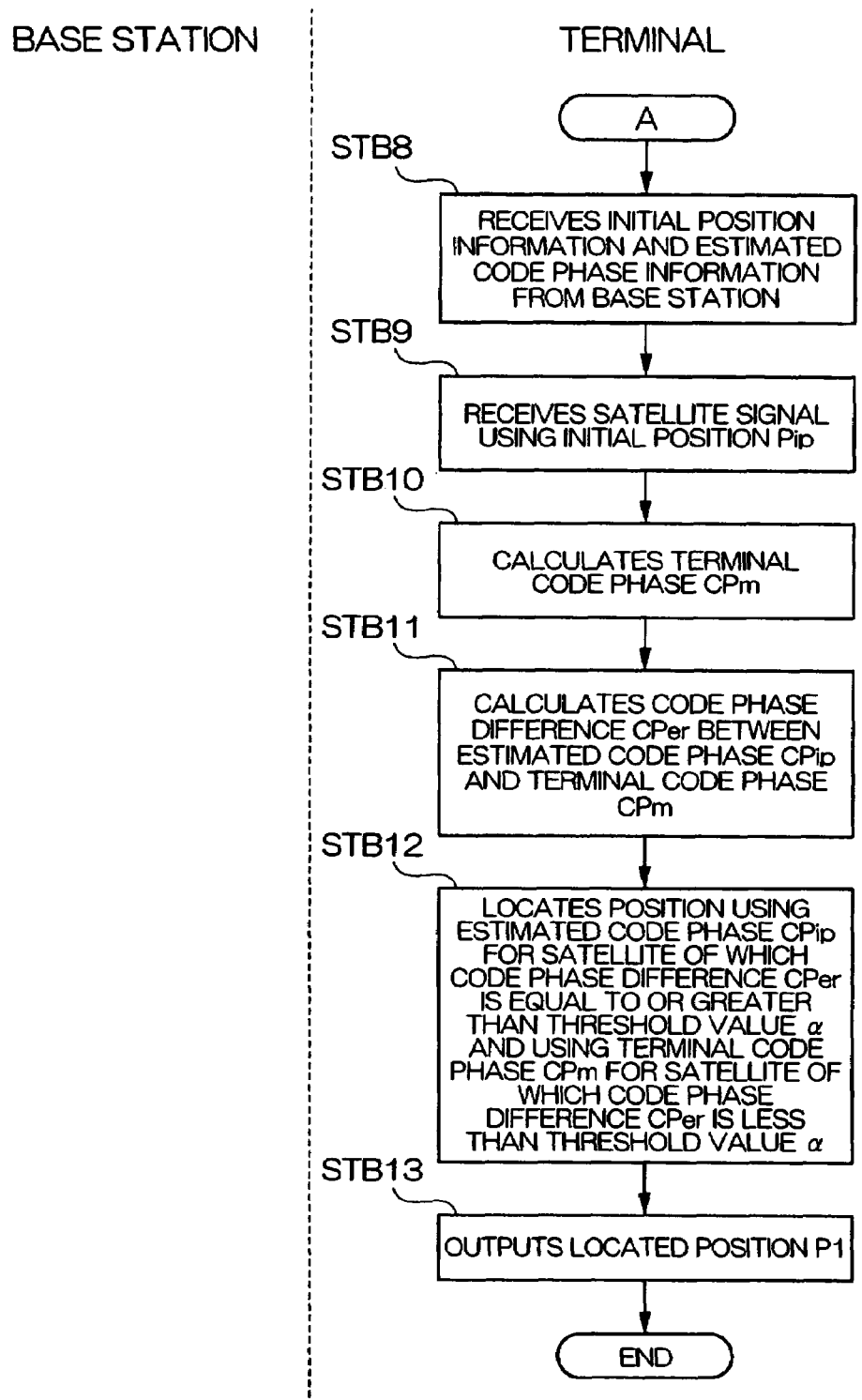
FIG. 20 is another schematic flowchart showing an operation example of the positioning system.

FIGS. 19 and 20 are schematic flowcharts showing an operation example of the positioning system 2010.

The base station 2040 calculates the RTT between the base station 2040 and the terminal 2020 (step STB1 in FIG. 19). The base station 2040 acquires the transmission direction information (step STB2).

The base station 2040 receives the radio waves S1 and the like and calculates the code phases CPb (step STB3).

The base station 2040 calculates the initial position Pip of the terminal 2020 based on the base station position Pb, the RTT, and the transmission direction (step STB4). The step STB4 exemplifies an initial position calculation step.

The base station 2040 calculates the estimated difference CPdif between the code phase at the base station position Pb and the code phase at the initial position Pip (step STB5). The step STB5 exemplifies an estimated difference calculation step.

The base station 2040 calculates the estimated code phase CPip at the initial position Pip based on the base station code phase CPb and the estimated difference CPdif (step STB6). The step STB6 exemplifies an estimated code phase calculation step.

The base station 2040 transmits the initial position information 2262 (see FIG. 12) and the estimated code phase information 2266 (see FIG. 12) to the terminal 2020 (step STB7). The step STB7 exemplifies a subsidiary information transmission step.

The terminal 2020 receives the initial position information 2262 and the estimated code phase information 2266 from the base station 2040 (step STB8 in FIG. 20). The terminal 2020 stores the initial position information 2262 and the estimated code phase information 2266 in the second storage section 2150 as the initial position information 2156 and the estimated code phase information 2158.

The terminal 2020 receives the C/A code carried on the radio wave S1 or the like using the initial position Pip (step STB9).

The terminal 2020 calculates the terminal code phase CPm (step STB10).

The terminal 2020 calculates the code phase difference CPer between the estimated code phase CPip and the terminal code phase CPm (step STB11).

The terminal 2020 locates the position using the estimated code phase CPip for a satellite of which the code phase difference CPer is equal to or greater than the threshold value α and using the terminal code phase CPm for a satellite of which the code phase difference CPer is less than the threshold value α (step STB12).

The terminal 2020 then outputs the located position P1 (step STB13).

The above steps allow occurrence of a multipath to be determined and the position to be accurately located when a multipath occurs in comparison with the case of using the code phase at the communication base station.

Modification of Second Embodiment

A modification of the second embodiment is described below.

A terminal 2020X and a base station 2040 according to the modification of the second embodiment are mainly configured in the same manner as the terminal 2020 and the base station 2040 according to the second embodiment. Therefore, the same sections are indicated by the same symbols, and description thereof is omitted. The following description mainly focuses on the differences from the terminal 2020 and the base station 2040 according to the second embodiment.

In the modification of the second embodiment, the terminal 2020X has most of the functions of the base station 2040 according to the second embodiment. This allows occurrence of a multipath to be determined and the position to be accurately located when a multipath occurs in comparison with the case of using the code phase at the communication base station without modifying the communication base station to a large extent.

Figure 21:
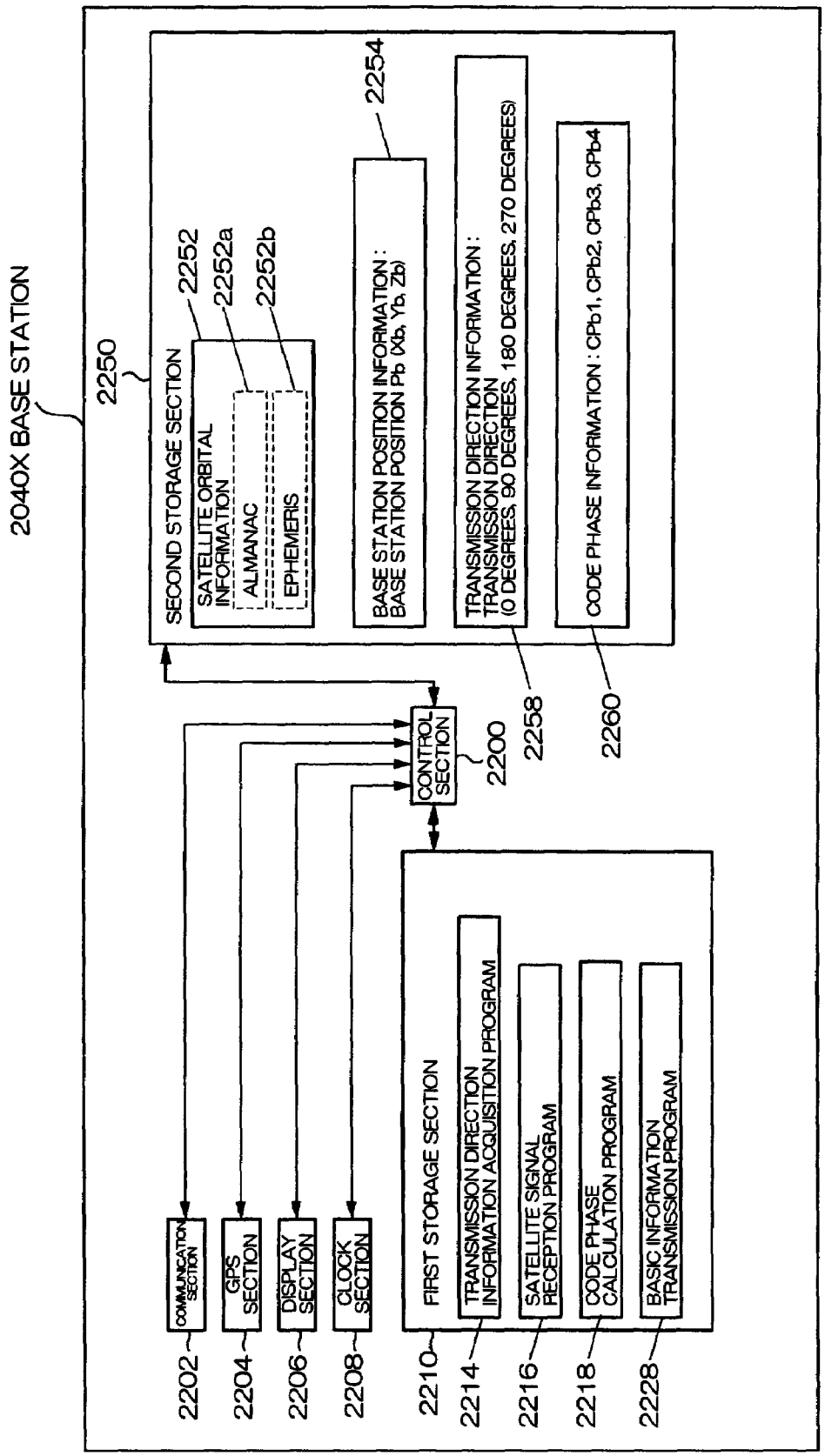
FIG. 21 is a schematic view showing the main software configuration of another base station.

FIG. 21 is a schematic view showing the main software configuration of the base station 2040X.

As shown in FIG. 21, the base station 2040X does not include the RTT calculation program 2212, the initial position calculation program 2220, the estimated difference calculation program 2222, the estimated code phase calculation program 2224, and the subsidiary information transmission program 2226, differing from the base station 2040 according to the second embodiment (see FIG. 12).

The base station 2040X stores a basic information transmission program 2228 in the first storage section 2150. The basic information transmission program 2228 is a program for causing the control section 2200 to transmit the base station position information 2254, the transmission direction information 2258, and the code phase information 2260 to the terminal 2020X.

Figure 22:
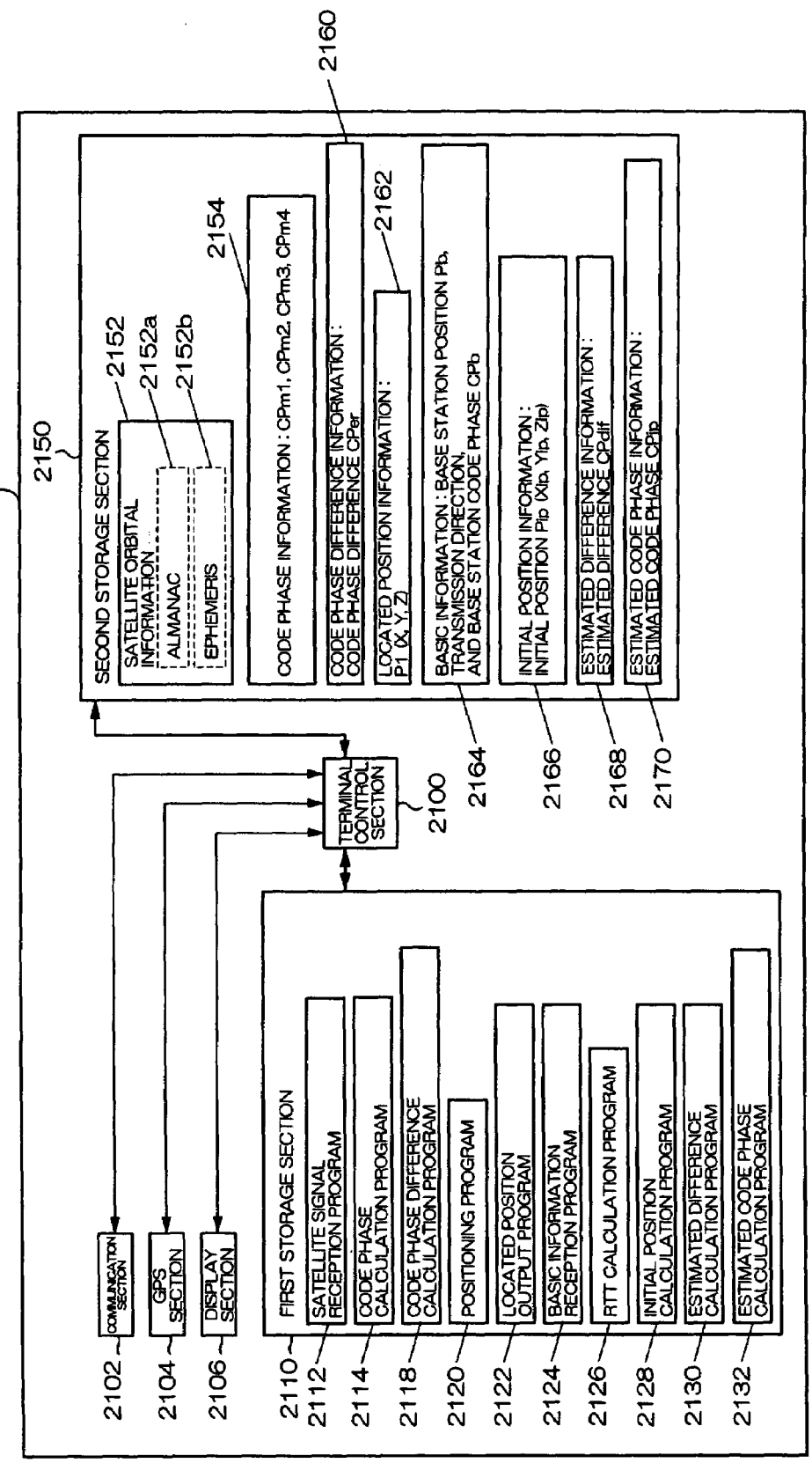
FIG. 22 is a schematic view showing the main software configuration of another terminal.

FIG. 22 is a schematic view showing the main software configuration of the terminal 2020X.

As shown in FIG. 22, the terminal 2020X does not include the subsidiary information reception program 2116, differing from the terminal 2020 according to the second embodiment (see FIG. 16).

The terminal 2020X stores a basic information reception program 2124 in the first storage section 2150. The basic information reception program 2124 is a program for causing the terminal control section 2100 to receive the base station position information 2254, the transmission direction information 2258, and the code phase information 2260 from the base station 2040X. The basic information reception program 2124 and the terminal control section 2100 exemplify a base station position information acquisition section, a transmission direction acquisition section, and a base station code phase acquisition section.

The terminal control section 2100 stores the base station position Pb included in the base station position information 2254, the transmission direction included in the transmission direction information 2258, and the base station code phase CPb included in the code phase information 2260 in the second storage section 2150 as basic information 2164.

As shown in FIG. 22, the terminal 2020X stores an RTT calculation program 2126 in the first storage section 2150. The RTT calculation program 2126 is the same as the RTT calculation program 2212 of the base station 2040 (see FIG. 12). The RTT calculation program 2126 and the terminal control section 2100 exemplify a propagation time calculation section.

In more detail, the terminal control section 2100 transmits a specific frame (hereinafter called "terminal frame") to the base station 2040X, and receives a frame (hereinafter called "base station frame") transmitted from the base station 2040X corresponding to the terminal frame. The terminal control section 2100 calculates the time RTT by measuring the transmission time of the specific terminal frame and the reception time of the base station frame corresponding to the terminal frame.

As shown in FIG. 22, the terminal 2020X stores an initial position calculation program 2128 in the first storage section 2150. The initial position calculation program 2128 is the same as the initial position calculation program 2220 of the base station 2040 (see FIG. 12). The initial position calculation program 2128 and the terminal control section 2100 exemplify an initial position calculation section.

The terminal control section 2100 stores initial position information 2166 indicating the calculated initial position Pip in the second storage section 2150.

Note that the terminal control section 2100 may receive signals from a plurality of base stations 2040X and calculate the initial position Pip based on the received signals, differing from this modification.

As shown in FIG. 22, the terminal 2020X stores an estimated difference calculation program 2130 in the first storage section 2150. The estimated difference calculation program 2130 is the same as the estimated difference calculation program 2222 of the base station 2040 (see FIG. 12). The estimated difference calculation program 2130 and the terminal control section 2100 exemplify an estimated difference calculation section.

The terminal control section 2100 stores estimated difference information 2168 indicating the calculated estimated difference CPdif in the second storage section 2150.

As shown in FIG. 22, the terminal 2020X stores an estimated code phase calculation program 2132 in the first storage section 2150. The estimated code phase calculation program 2132 is the same as the estimated code phase calculation program 2224 of the base station 2040 (see FIG. 12). The estimated code phase calculation program 2132 and the terminal control section 2100 exemplify an estimated code phase calculation section.

The terminal control section 2100 stores estimated code phase information 2170 indicating the calculated estimated code phase CPip in the second storage section 2150.

In the modification of the second embodiment, the terminal 2020X calculates the initial position Pip and the estimated code phase CPip, as described above.

(Program, Computer-readable Recording Medium, and the Like)

A program for controlling a communication base station may be provided which causes a computer to execute the initial position calculation step, the estimated difference calculation step, the estimated code phase calculation step, the subsidiary information transmission step, and the like of the above-described operation example.

A computer-readable recording medium or the like may also be provided which stores such a program for controlling a communication base station or the like.

A program storage medium used to install the program for controlling a communication base station or the like in a computer to allow the program and the like to be executable by the computer may be implemented by a package medium such as a flexible disk such as a floppy disk®, a compact disk read only memory (CD-ROM), a compact disk-recordable (CD-R), a compact disk-rewritable (CD-RW), or a digital versatile disk (DVD), a semiconductor memory, a magnetic disk, or a magnetooptical disk in which the program is stored temporarily or permanently, or the like.

The second embodiment has been described above. Note that various modifications and variations may be made.

For example, the base station 2040 may receive the terminal code phase CPm from the terminal 2020, calculate the code phase difference CPer, and compare the code phase difference CPer with the threshold value α, differing from the second embodiment. The base station 2040 may transmit the terminal code phase CPm or the estimated code phase CPip used for positioning to the terminal 2020.

Although two embodiments have been described above, the invention is not limited to the above two embodiments. The above embodiments may be configured in combination.

Although only some embodiments of the invention have been described above in detail, those skilled in the art would readily appreciate that many modifications are possible in the embodiments without materially departing from the novel teachings and advantages of the invention. Accordingly, such modifications are intended to be included within the scope of the invention.

What is claimed is:

1. A communication base station which is communicable with a positioning device being located at a position by using satellite signals from a plurality of positioning satellites, is located at a fixed position, and includes a storage section which stores a program, the communication base station being a section which operates by executing the program and functioning as:

a propagation time calculation section which calculates a propagation time required for a communication radio wave to propagate between the communication base station and the positioning device;

a propagation time evaluation section which determines whether or not the propagation time is within a predetermined allowable time range;

a satellite signal reception section which receives the satellite signals;

a code phase calculation section which calculates a code phase of each of the satellite signals;

a positioning-side code phase reception section which receives a positioning-side code phase which is a code phase of each of the satellite signals calculated by the positioning device;

a difference calculation section which calculates a difference between the code phase calculated by the code phase calculation section and the positioning-side code phase received from the positioning device;

a difference evaluation section which determines whether or not the difference is within a multipath range which is a difference range when the positioning-side code phase is affected by a multipath; and a correction value transmission section which transmits the code phase calculated by the communication base station to the positioning device when the difference evaluation section has determined that the difference is within the multipath range.

2. The communication base station as defined in claim 1, wherein
the allowable time range is specified as a time range when the communication base station and the positioning device are so close that positions of the communication base station and the positioning device are considered to be almost identical.

3. The communication base station as defined in claim 1, wherein
the multipath range is specified taking into account a distance corresponding to the allowable time range and a calculation error of the positioning-side code phase.

4. A method of controlling a communication base station which is communicable with a positioning device which locates a position by using satellite signals from a plurality of positioning satellites and is located at a fixed position, the method comprising:

calculating a propagation time required for a communication radio wave to propagate between the communication base station and the positioning device;

determining whether or not the propagation time is within a predetermined allowable time range;

receiving the satellite signals;

calculating a code phase of each of the satellite signals;

receiving a positioning-side code phase which is a code phase of each of the satellite signals calculated by the positioning device;

calculating a difference between the code phase calculated by the communication base station and the positioning-side code phase received from the positioning device;

determining whether or not the difference is within a multipath range which is a difference range when the positioning-side code phase is affected by a multipath; and transmitting the code phase calculated by the communication base station to the positioning device when the difference has been determined to be within the multipath range.

5. A computer-readable recording medium storing a program for causing a computer included in a communication base station, which is communicable with a positioning device which locates a position by using satellite signals from a plurality of positioning satellites and is located at a fixed position, to execute the method as defined in claim 4.

6. A method of controlling a positioning device which is communicable with a communication base station located at a fixed position and locates a position by using satellite signals from a plurality of positioning satellites, the method comprising:

receiving a code phase calculated by the communication base station when the communication base station has determined that a propagation time required for a communication radio wave to propagate between the communication base station and the positioning device is within a predetermined allowable time range, and has calculated a difference between the code phase calculated by the communication base station based on the received satellite signal and a positioning-side code phase which is a code phase of each of the satellite signals calculated by the positioning device, and the difference is within a multipath range which is a difference range when the positioning-side code phase is affected by a multipath; and locating a position by using the code phase calculated by the communication base station and the positioning-side code phase.

7. A positioning system comprising a positioning device which includes a storage section which stores a positioning device program and locates a position by using satellite signals from a plurality of positioning satellites and a communication base station which includes a storage section which stores a communication base station program and is communicable can communicate with the positioning device, the communication base station being a section which operates by executing the communication base station program and functioning as:

an initial position calculation section which calculates an initial position of the positioning device;

a code phase calculation section which calculates a code phase of the satellite signal at a position of the communication base station;

an estimated difference calculation section which estimates a difference between the code phase calculated by the code phase calculation section and a code phase of the satellite signal on assumption that the communication base station is located at the initial position as an estimated difference;

an estimated code phase calculation section which estimates the code phase on assumption that the communication base station is located at the initial position as an estimated code phase based on the code phase calculated by the code phase calculation section and the estimated difference; and a subsidiary information transmission section which transmits the initial position and the estimated code phase to the positioning device; and the positioning device being a section which operates by executing the positioning device program and functioning as:

a terminal code phase calculation section which calculates a code phase at a position of the positioning device as a terminal code phase based on the satellite signal;

a code phase difference calculation section which calculates a code phase difference between the estimated code phase and the terminal code phase; and a positioning section which locates a position by using the estimated code phase or the terminal code phase depending on the code phase difference.

8. The positioning system as defined in claim 7, wherein the initial position calculation section of the communication base station calculates the initial position of the positioning device based on the position of the communication base station, a propagation time required for a communication radio wave to propagate between the communication base station and the positioning device, and a transmission direction of the communication radio wave.

9. A positioning device which includes a storage section which stores a program and locates a position by using satellite signals from a plurality of positioning satellites, the positioning device being a section which operates by executing the program and functioning as:

a base station position information acquisition section which acquires base station position information from a communication base station which is communicable with the positioning device, the base station position information indicating a position of the communication base station;

a transmission direction information acquisition section which acquires transmission direction information indicating a transmission direction of a communication radio wave transmitted from the communication base station to the positioning device;

a base station code phase acquisition section which acquires a base station code phase from the communication base station, the base station code phase being a code phase at a position of the communication base station calculated by the communication base station based on the satellite signal;

a propagation time calculation section which calculates a propagation time required for a communication radio wave to propagate between the communication base station and the positioning device;

an initial position calculation section which calculates an initial position of the positioning device based on the position of the communication base station, the transmission direction, and the propagation time;

an estimated difference calculation section which estimates a difference between the code phase at the position of the communication base station and a code phase of the satellite signal at the initial position as an estimated difference;

an estimated code phase calculation section which estimates the code phase at the initial position as an estimated code phase based on the base station code phase and the estimated difference;

a terminal code phase calculation section which calculates a code phase at a position of the positioning device as a terminal code phase based on the satellite signal;

a code phase difference calculation section which calculates a code phase difference between the estimated code phase and the terminal code phase; and a positioning section which locates a position by using the estimated code phase or the terminal code phase depending on the code phase difference.

10. A positioning device which includes a storage section which stores a program and locates a position by using satellite signals from a plurality of positioning satellites, the positioning device being a section which operates by executing the program and functioning as:

a base station position information acquisition section which acquires base station position information from a communication base station which is communicable with the positioning device, the base station position information indicating a position of the communication base station;

a base station code phase acquisition section which acquires a base station code phase from the communication base station, the base station code phase being a code phase at a position of the communication base station calculated by the communication base station based on the satellite signal;

an initial position calculation section which calculates an initial position utilizing communication radio waves from a plurality of the communication base stations;

an estimated difference calculation section which estimates a difference between the code phase at the position of the communication base station and a code phase of the satellite signal at the initial position as an estimated difference;

an estimated code phase calculation section which estimates the code phase at the initial position as an estimated code phase based on the base station code phase and the estimated difference;

a terminal code phase calculation section which calculates a code phase at a position of the positioning device as a terminal code phase based on the satellite signal;

a code phase difference calculation section which calculates a code phase difference between the estimated code phase and the terminal code phase; and a positioning section which locates a position by using the estimated code phase or the terminal code phase depending on the code phase difference.

11. A method of controlling a communication base station which is communicable with a positioning device which locates a position by using satellite signals from a plurality of positioning satellites, the method comprising:

calculating an initial position of the positioning device;

calculating a code phase of the satellite signal;

estimating a difference between the calculated code phase and a code phase of the satellite signal calculated on assumption that the communication base station is located at the initial position as an estimated difference;

estimating the code phase of the satellite signal on assumption that the communication base station is located at the initial position as an estimated code phase based on the calculated code phase and the estimated difference; and transmitting the initial position and the estimated code phase to the positioning device.

12. A computer-readable recording medium storing a program for causing a computer included in a communication base station, which is communicable with a positioning device which locates a position by using satellite signals from a plurality of positioning satellites, to execute the method as defined in claim 11.

* * * * *